United States Patent
Chun

(10) Patent No.: US 12,294,973 B2
(45) Date of Patent: May 6, 2025

(54) METHOD FOR PROVIDING COMMUNICATION SERVICE IN WIRELESS COMMUNICATION SYSTEM

(71) Applicant: LG Electronics Inc., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 570 days.

(21) Appl. No.: 17/417,584

(22) PCT Filed: Dec. 26, 2019

(86) PCT No.: PCT/KR2019/018532
§ 371 (c)(1),
(2) Date: Jun. 23, 2021

(87) PCT Pub. No.: WO2020/138985
PCT Pub. Date: Jul. 2, 2020

(65) Prior Publication Data
US 2022/0116908 A1    Apr. 14, 2022

(30) Foreign Application Priority Data

Dec. 26, 2018 (KR) .......................... 10-2018-0169516

(51) Int. Cl.
*H04W 68/00* (2009.01)
*H04W 24/08* (2009.01)
(Continued)

(52) U.S. Cl.
CPC ......... *H04W 68/005* (2013.01); *H04W 24/08* (2013.01); *H04W 60/04* (2013.01); *H04W 76/10* (2018.02)

(58) Field of Classification Search
CPC ... H04W 68/005; H04W 24/08; H04W 60/04; H04W 76/10; H04W 68/12; H04W 76/27; H04W 88/06
See application file for complete search history.

(56) References Cited

U.S. PATENT DOCUMENTS

2009/0280802 A1* 11/2009 Chin ................. H04W 36/0088
455/426.1
2013/0316718 A1   11/2013 Hsu et al.
(Continued)

FOREIGN PATENT DOCUMENTS

| KR | 10-2011-0018896 A | 2/2011 |
| KR | 10-2012-0085832 A | 8/2012 |
| KR | 10-2013-0066532 A | 6/2013 |

OTHER PUBLICATIONS

Qualcomm Incorporated et al., Avoidance of paging collisions to minimize outage of services. S2-174243. SA WG2 Meeting #122. San Jose Del Cabo, Mexico. Jun. 20, 2017.

*Primary Examiner* — Joseph E Dean, Jr.
(74) *Attorney, Agent, or Firm* — BRYAN CAVE LEIGHTON PAISNER LLP

(57) ABSTRACT

Disclosed is a method for providing, by a terminal, a communication service in a wireless communication system, the method including: transmitting, to a first network, a first request message for receiving paging of a second network; receiving, from the first network, a first response message as a response to the first request message; and monitoring the second network or switching to the second network to receive the paging from the second network based on the first response message,
in which the terminal may be in a registered state in relation to the first network and the second network, and in a connected state in relation to the first network.

20 Claims, 16 Drawing Sheets

(51) Int. Cl.
*H04W 60/04* (2009.01)
*H04W 76/10* (2018.01)

(56) References Cited

U.S. PATENT DOCUMENTS

2015/0092630 A1* 4/2015 Lin .......................... H04L 5/14
370/280
2017/0094628 A1* 3/2017 Miao ................... H04W 60/005

* cited by examiner

【FIG. 1】
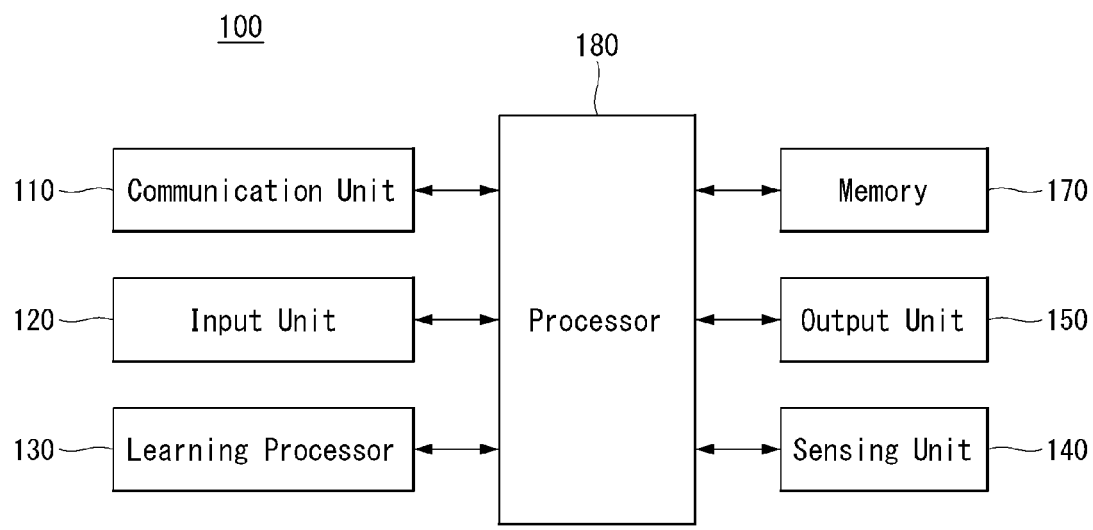
【FIG. 2】
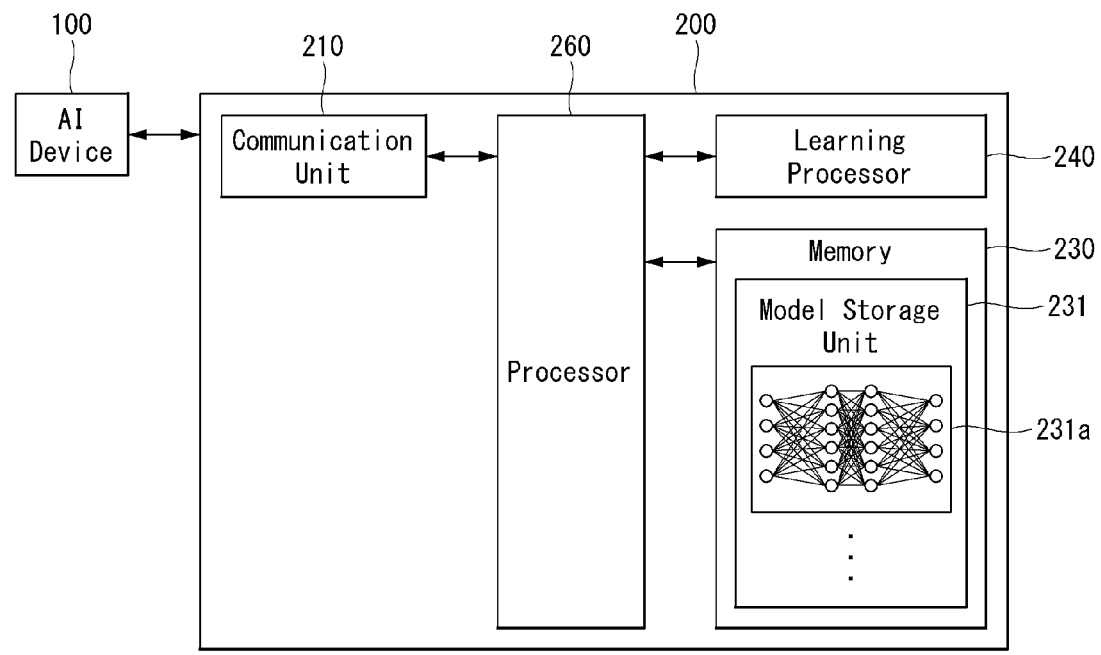

[FIG. 3]
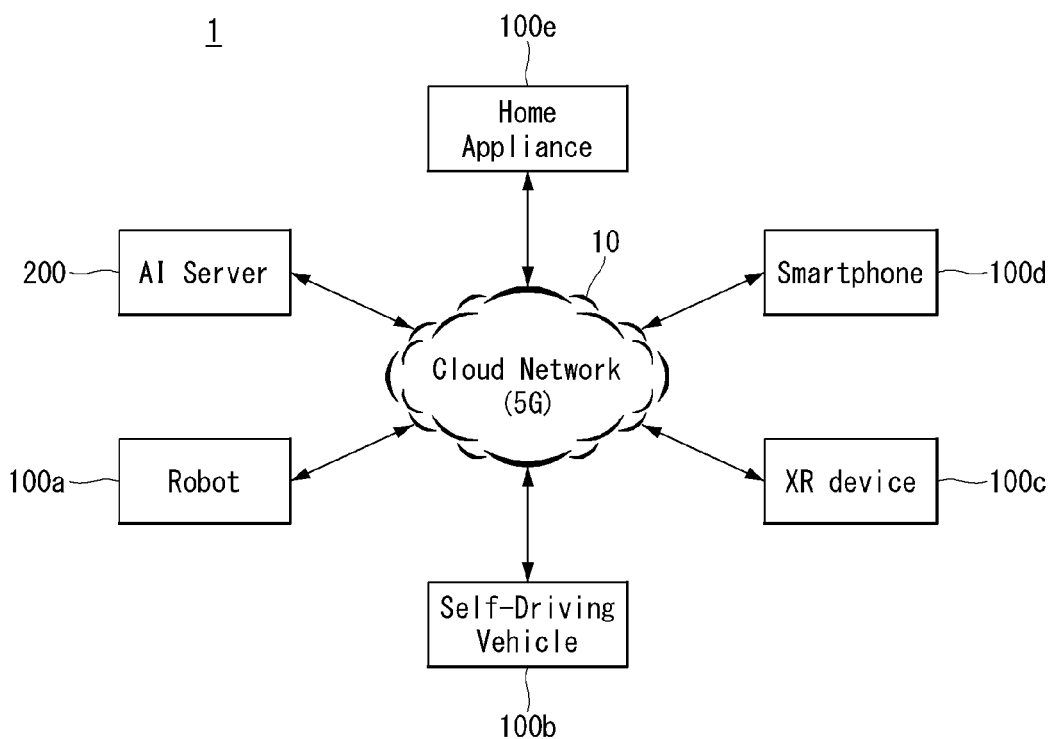

[FIG. 4]
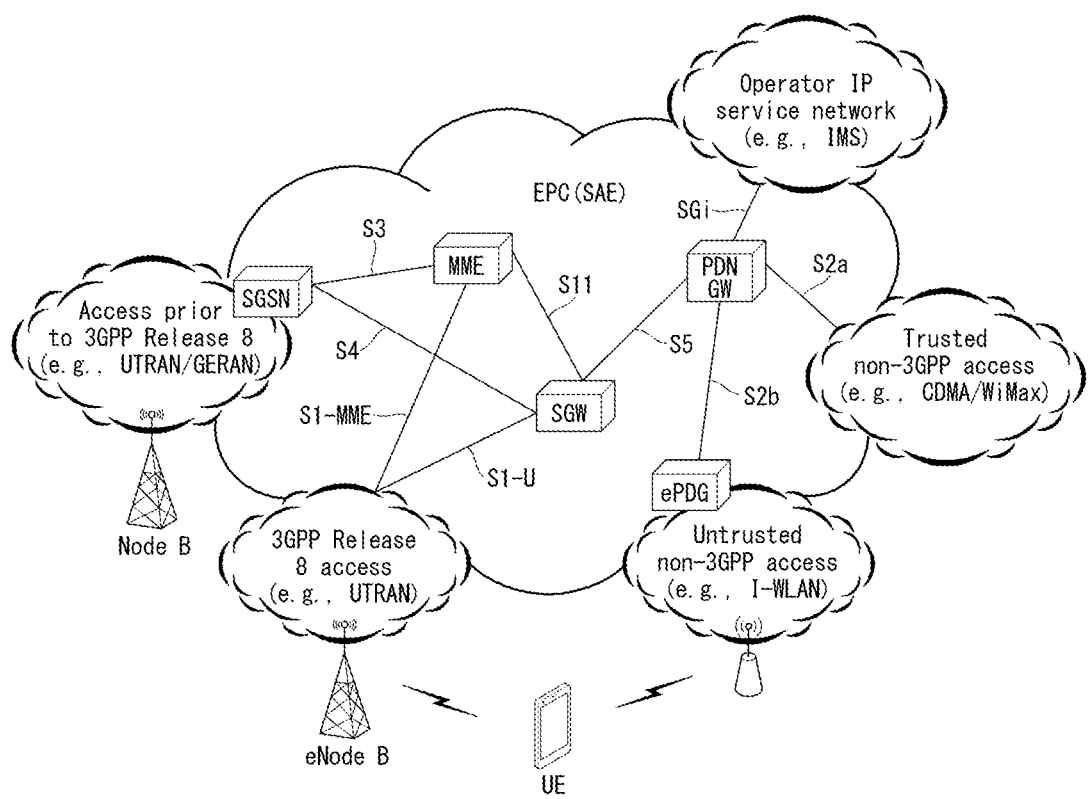

[FIG. 5]
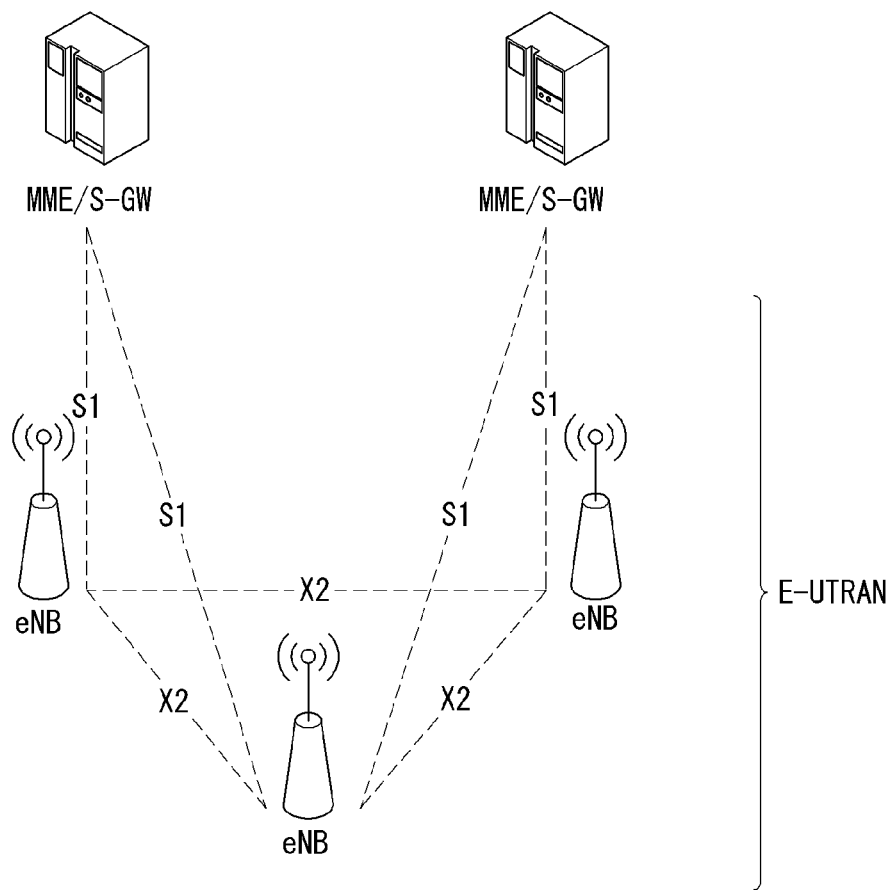

[FIG. 6]
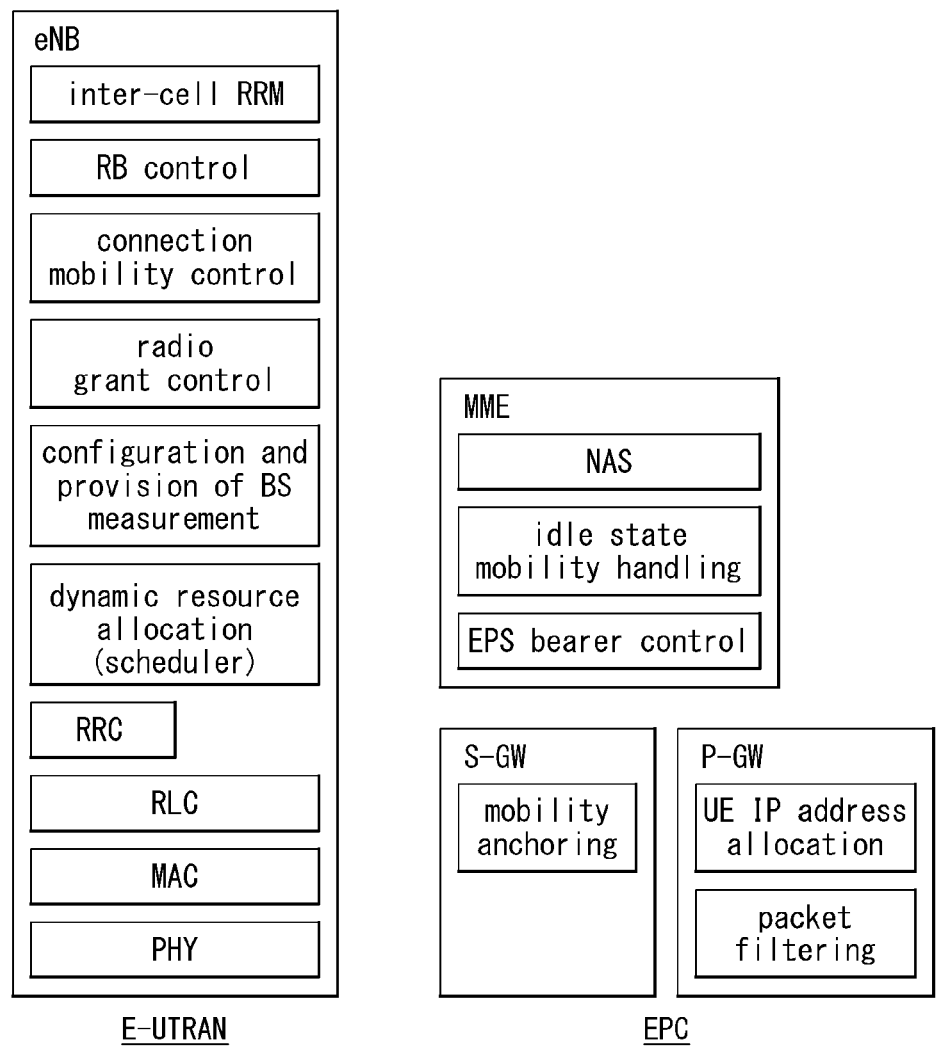

[FIG. 7]
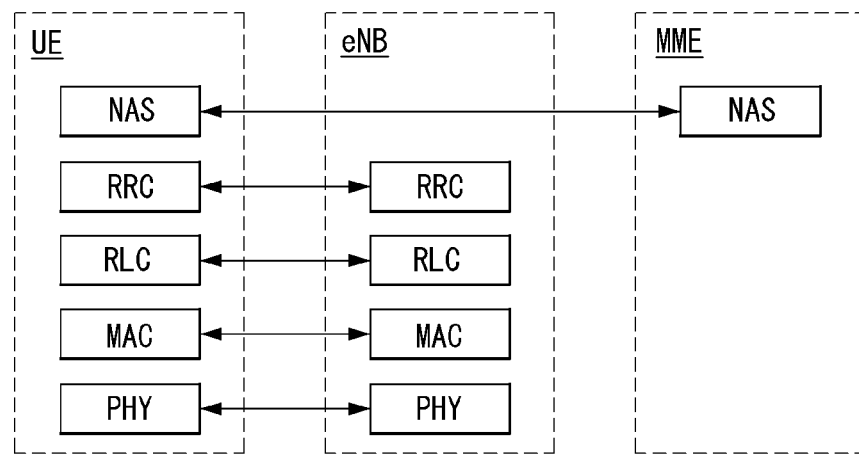

[FIG. 8]
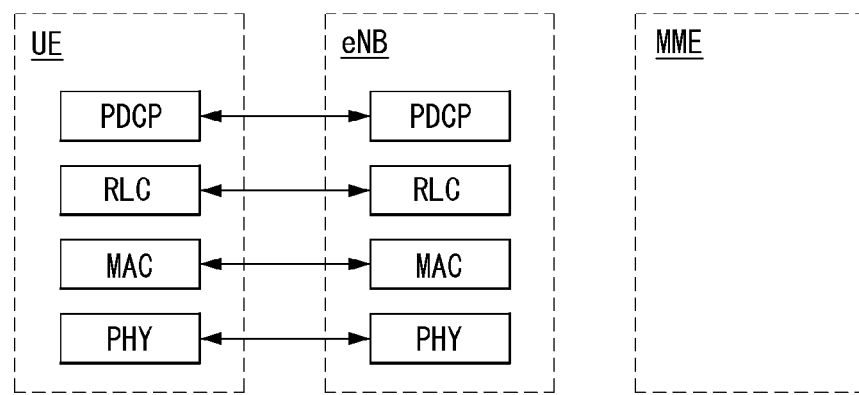

[FIG. 9]
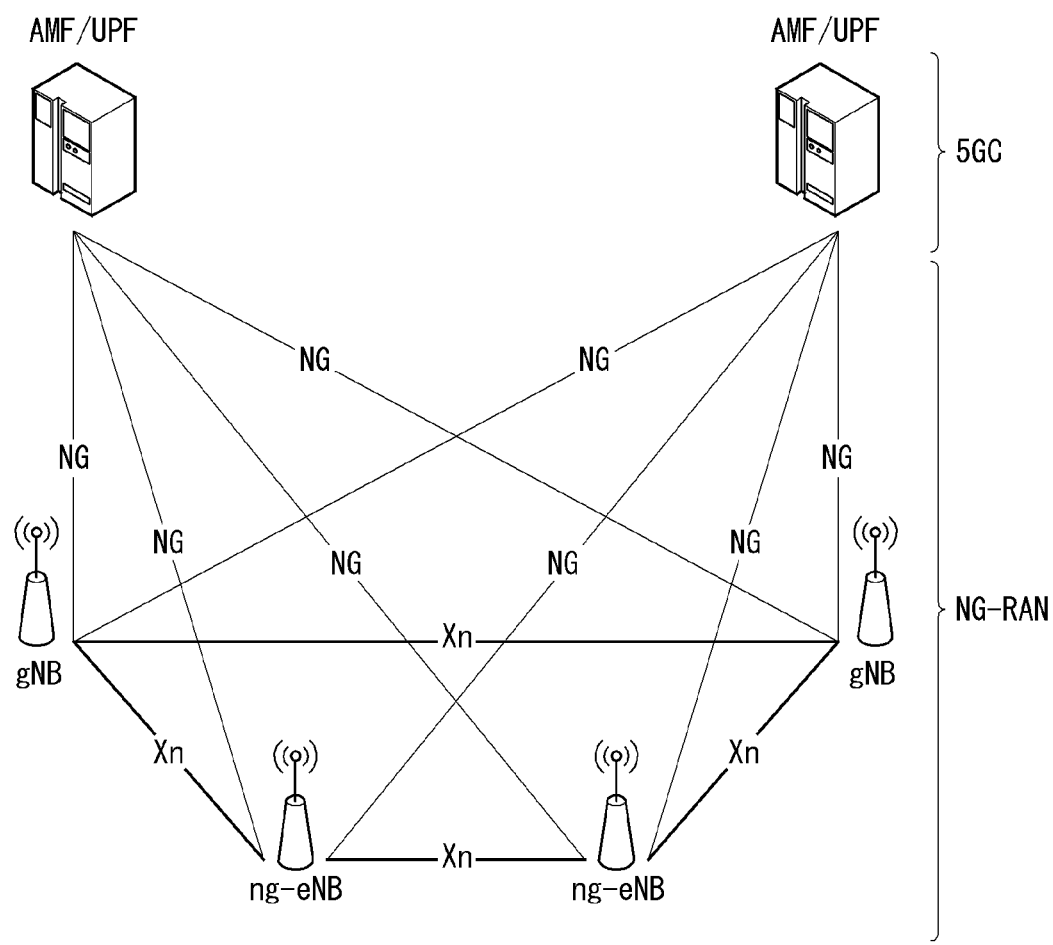

[FIG. 10]
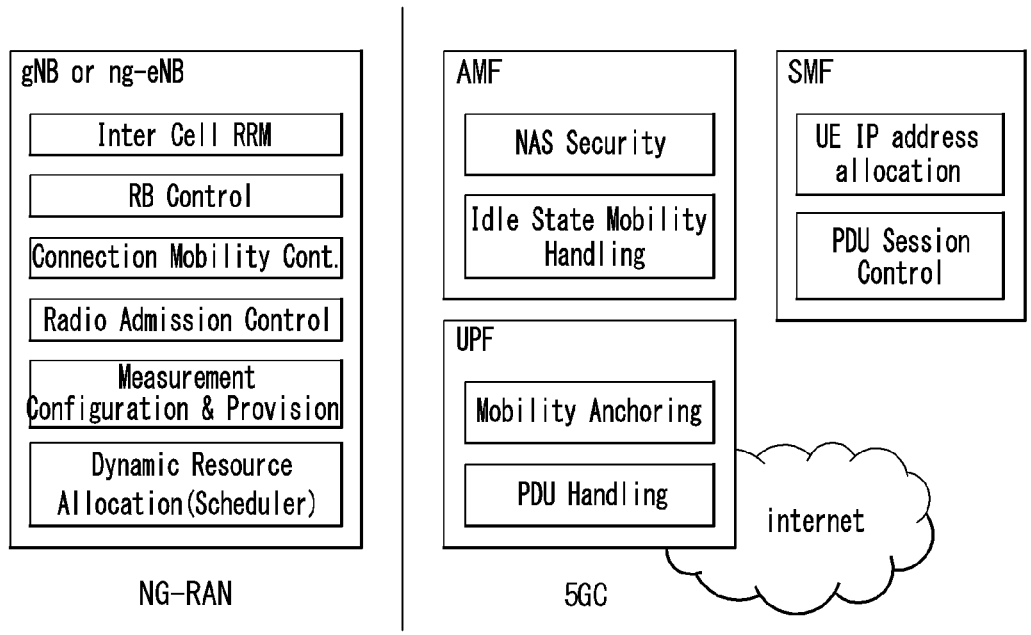
[FIG. 11]
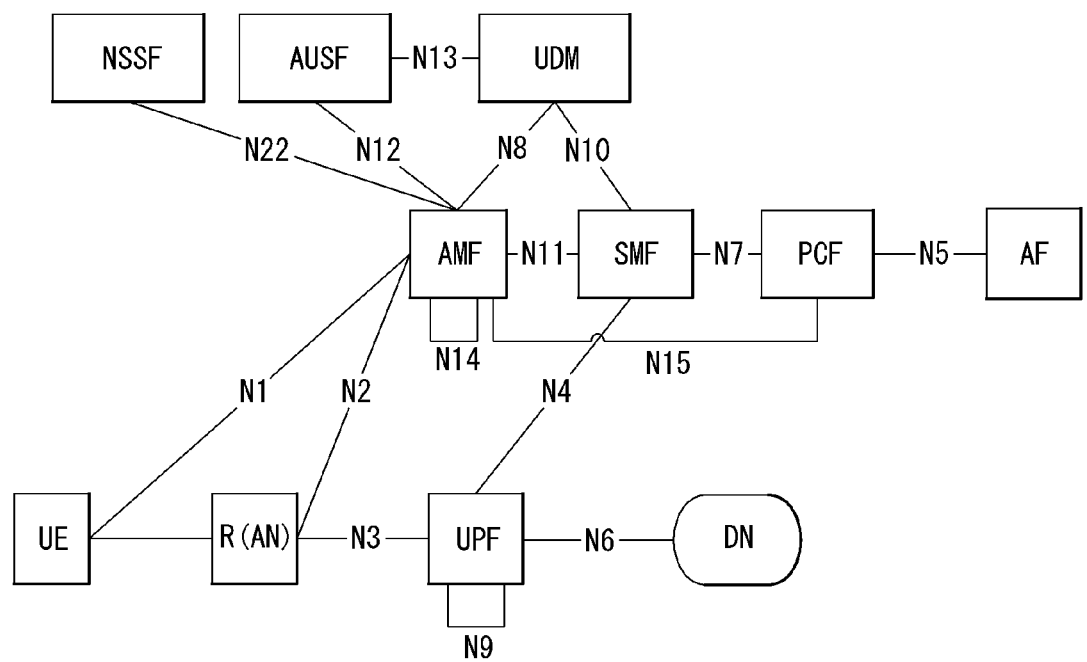

[FIG. 12]
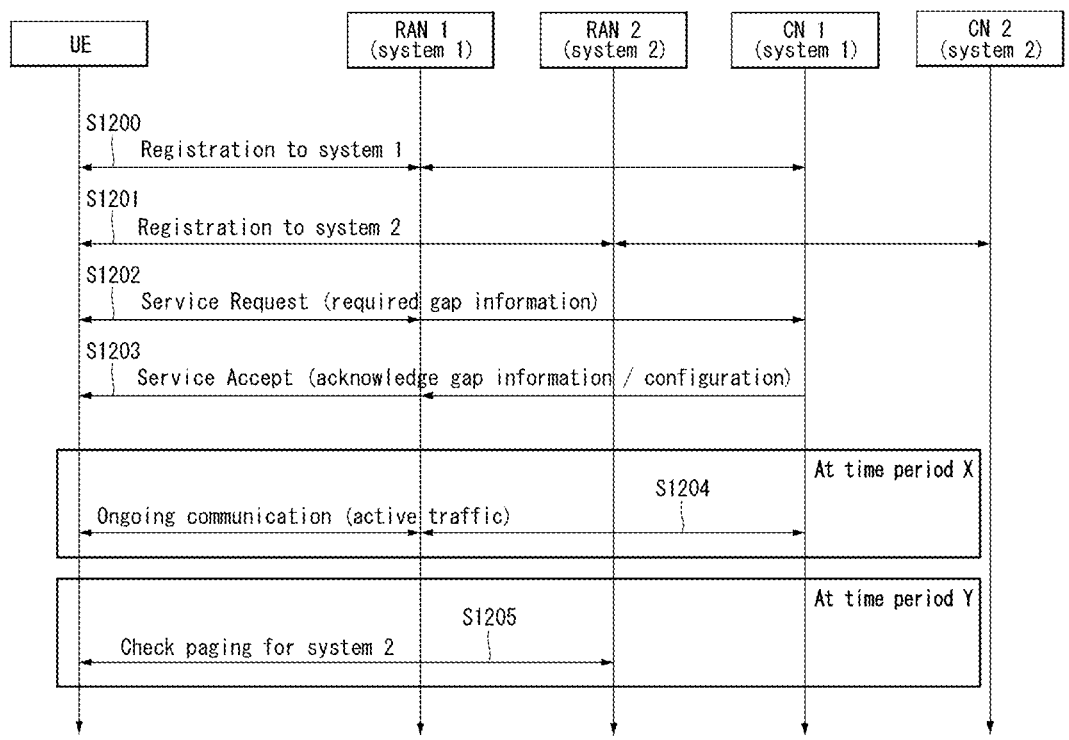

[FIG. 13]
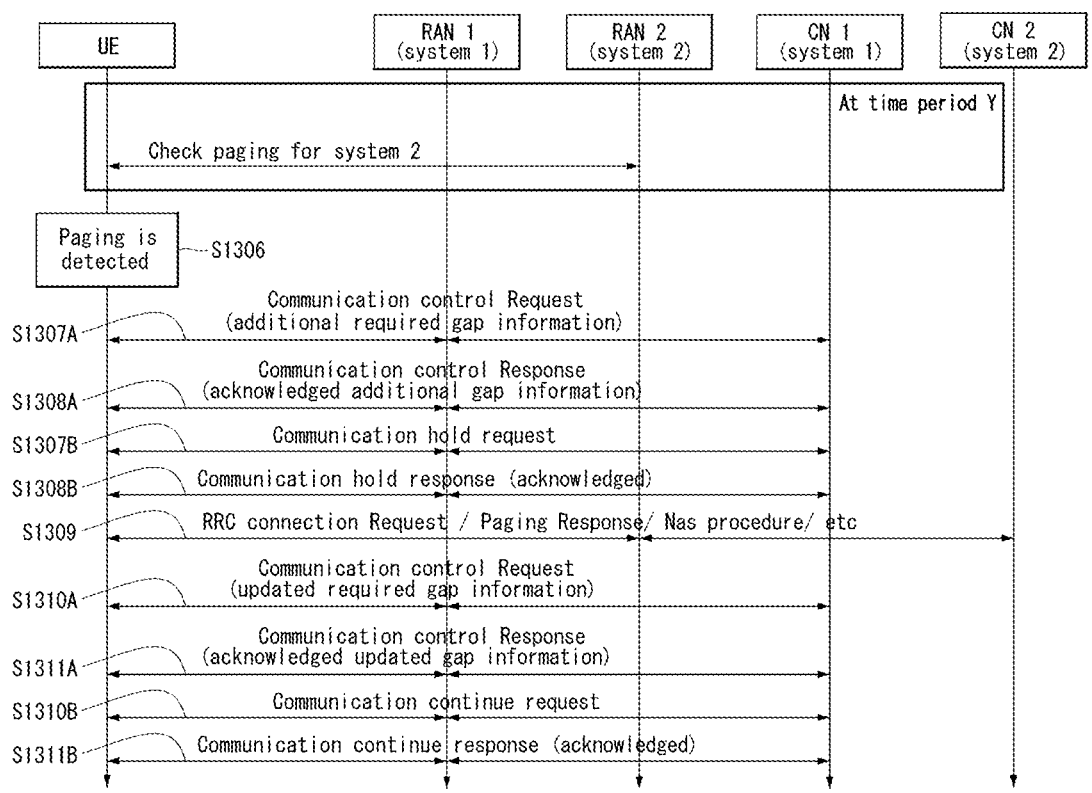

[FIG. 14]
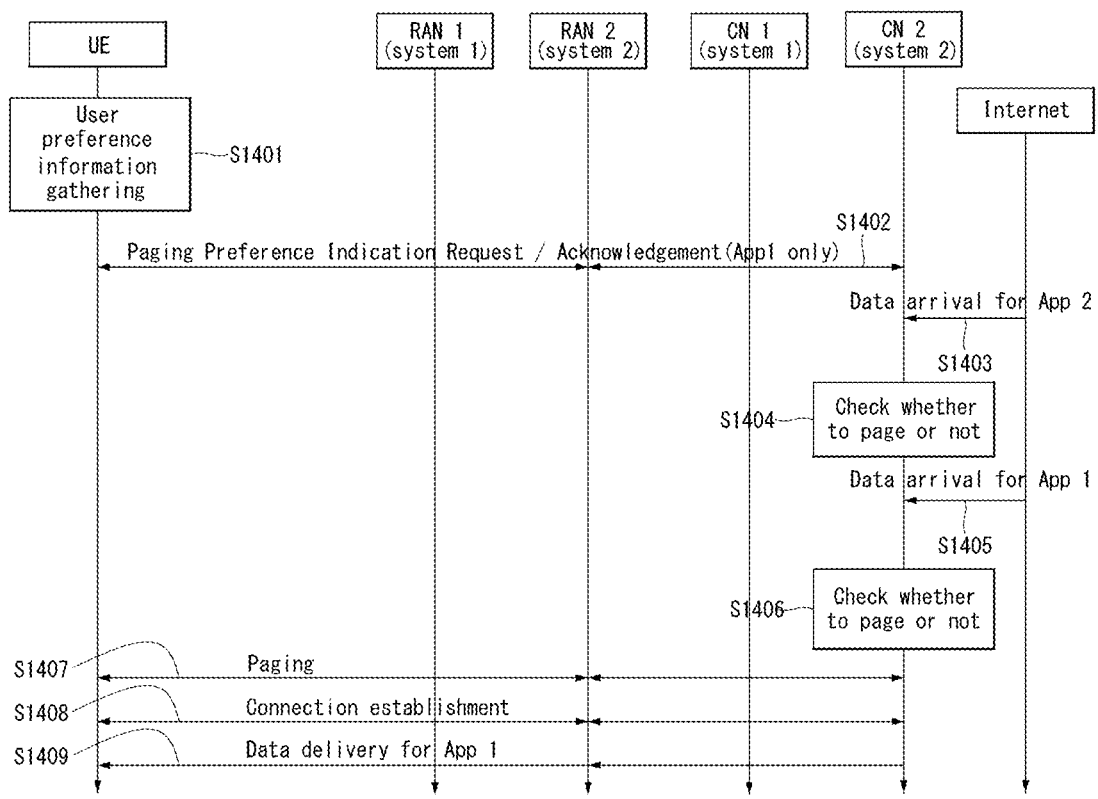

[FIG. 15]
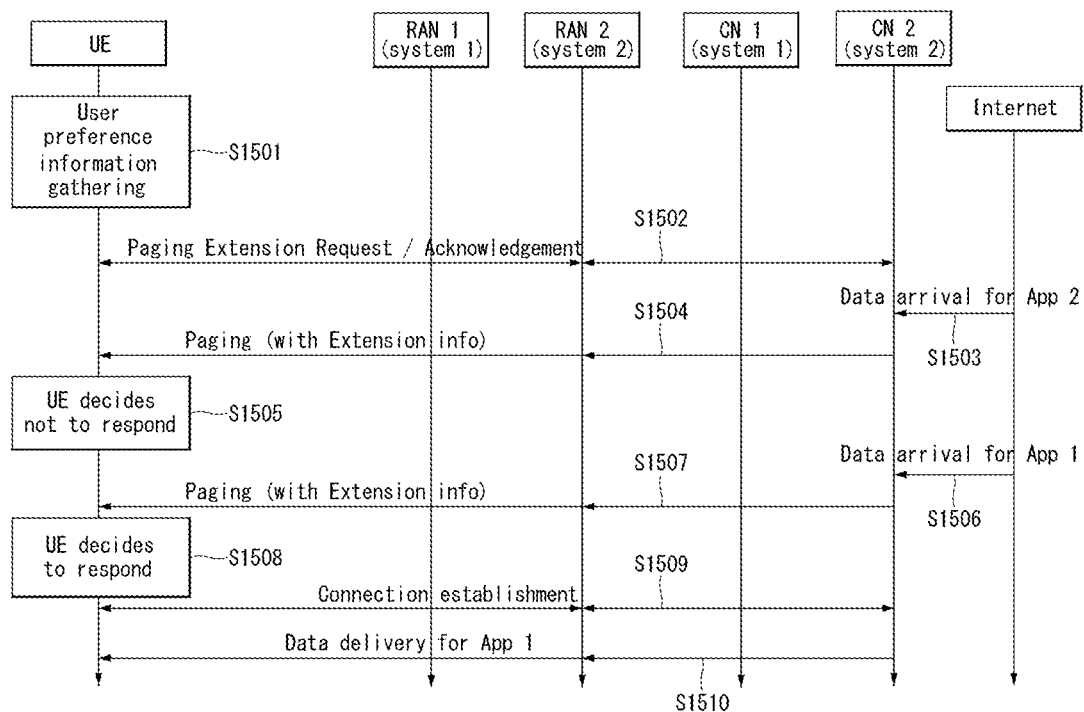

【FIG. 16】
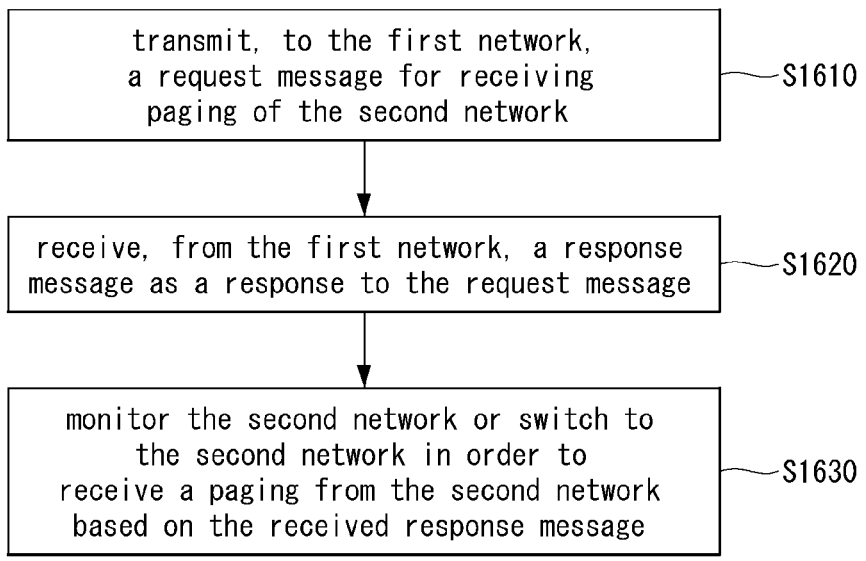
【FIG. 17】
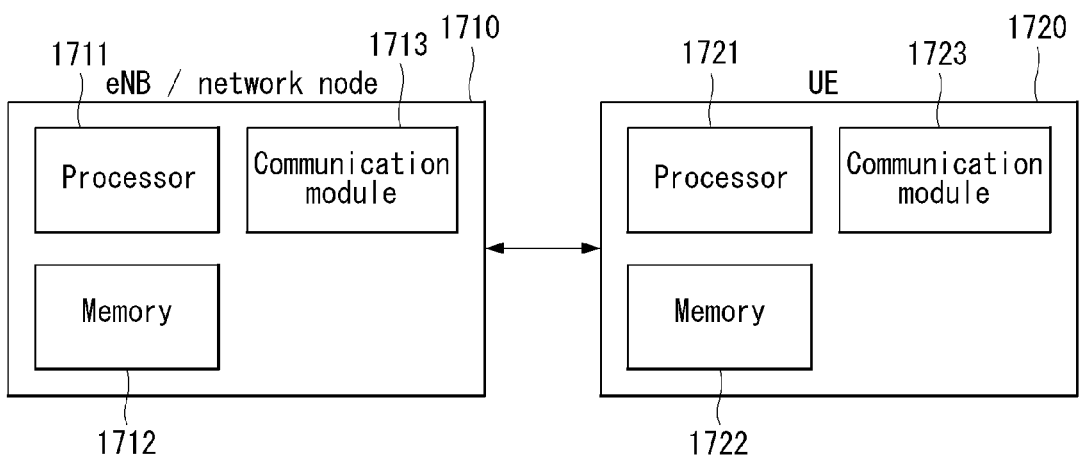

[FIG. 18]
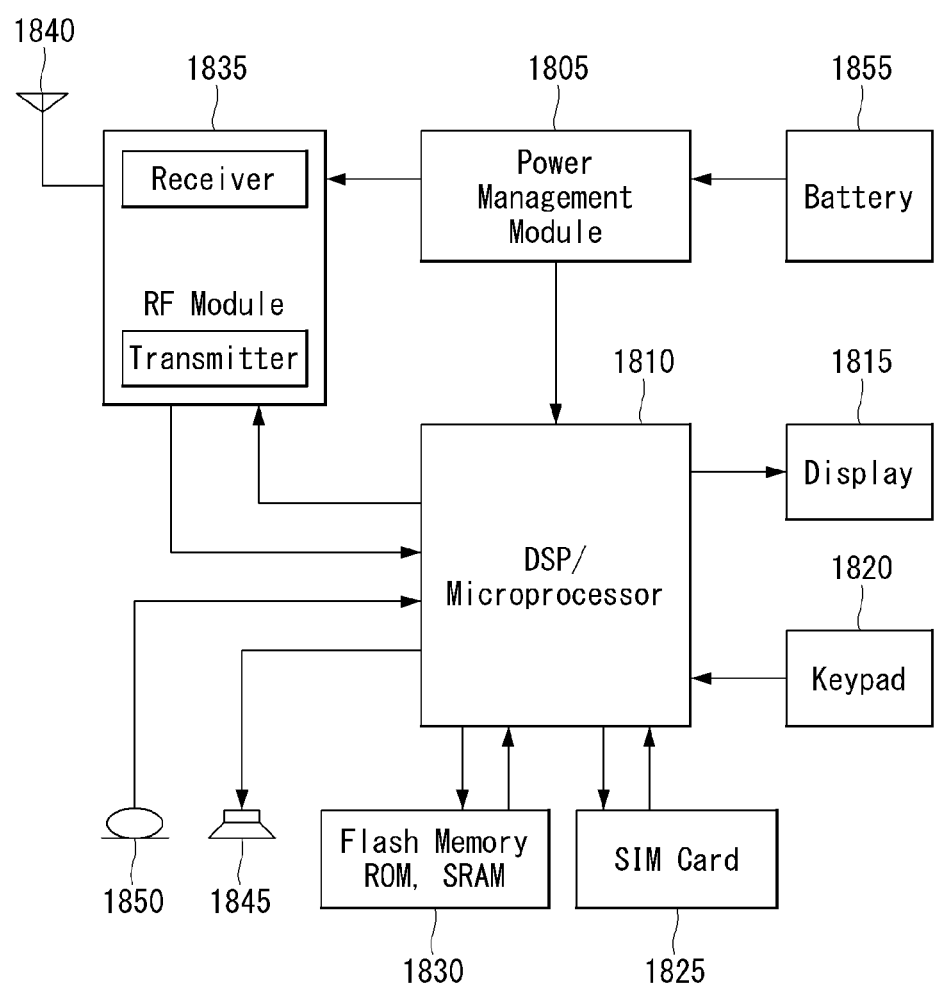

[FIG. 19]
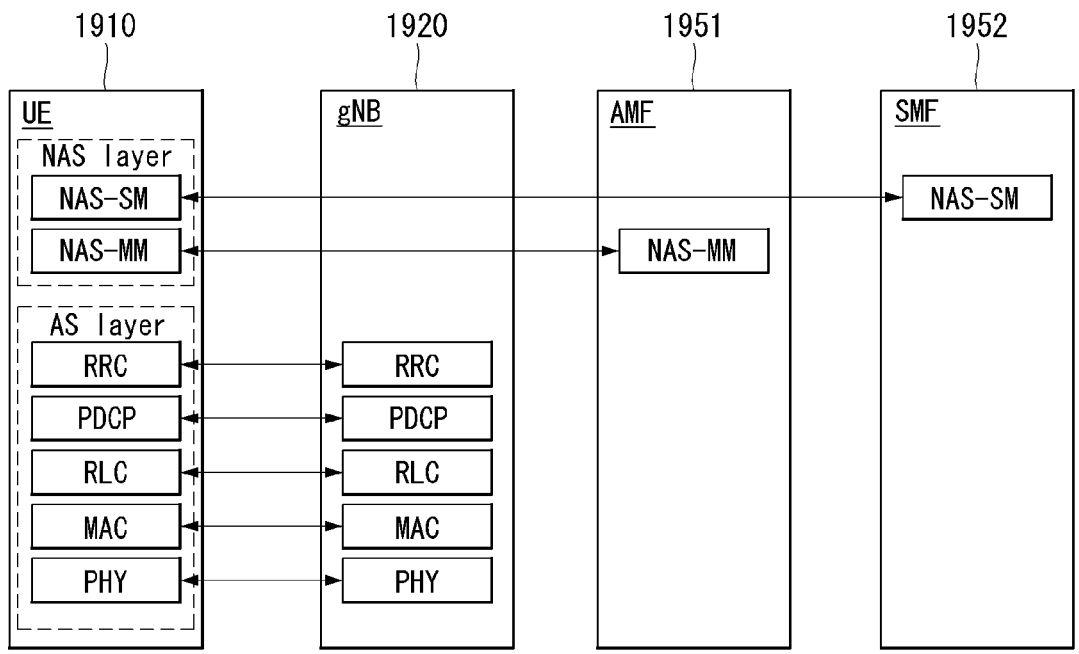

METHOD FOR PROVIDING COMMUNICATION SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2019/018532, filed on Dec. 26, 2019, which claims the benefit of KR Application No. 10-2018-0169516, filed on Dec. 26, 2018, the contents of which are all hereby incorporated by reference herein in their entirety.

TECHNICAL FIELD

The present disclosure relates to a wireless communication system, and more particularly, to a communication system and method for providing different services provide services to users without conflict by allowing terminals providing services to the users in connection with a plurality of systems to effectively receive paging from different systems when the terminals may not simultaneously provide services linked with each system.

BACKGROUND ART

In a wireless communication system, a mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

According to the related art, when paging signals of a plurality of operator networks are simultaneously received by one UE (at least partially overlapping in time), the paging signals collide with each other. Accordingly, in terms of the network, there is a problem that a sufficient service may not be provided to a terminal for a predetermined time.

An object of the present disclosure is to provide a method and apparatus for efficiently receiving a plurality of paging signals in a wireless communication system in a collision occasion between the paging signals simultaneously received by a terminal from a plurality of networks.

Objects of the present disclosure are not limited to the above-mentioned objects. That is, other objects that are not mentioned may be obviously understood by those skilled in the art to which the present disclosure pertains from the following description.

Technical Solution

According to an aspect of the present disclosure, a method for providing, by a terminal, a communication service in a wireless communication system includes: transmitting, to a first network, a first request message for receiving paging of a second network; receiving, from the first network, a first response message as a response to the first request message; and monitoring the second network or switching to the second network to receive the paging from the second network based on the first response message, in which the terminal may be in a registered state in relation to the first network and the second network, and in a connected state in relation to the first network.

The first request message may include time information indicating when the terminal requests the first network to receive signaling from the second network.

The first response message may include time information indicating when the terminal has no signaling received from the first network or signaling transmitted to the first network.

The method may further include: transmitting, to the first network, a second request message for switching to the second network based on the paging received from the second network; and receiving, from the first network, a second response message as the response to the first request message.

The second request message may be for temporarily stopping the connected state related to the first network.

The second request message may include time information required in relation to a procedure performed by the terminal through the second network.

The second response message may include time information when data transmission/reception does not occur between the first network and the terminal.

The method may further include: performing configuration related to establishment of a communication connection with the second network based on the paging received by the second network; transmitting, to the first network, a third request message for re-adjusting a communication connection with the first network based on the configuration related to the establishment of the communication connection; and receiving, from the first network, a third response message as a response to the third request message.

The third request message may include time information when the terminal does not communicate with the first network.

The third response message may include time information indicating when there is no signaling received from the first network or signaling transmitted to the first network.

The method may further include: transmitting, to the second network, a fourth request message for requesting paging related to a preferred service or traffic; and receiving a paging from the second network as a response to the fourth request message.

The paging of the second network may include information related to a type of the service or traffic supported by the second network.

According to another aspect of the present disclosure, a terminal for providing a communication service in a wireless communication system includes: a transceiver; a memory; and a processor configured to control the transceiver and the memory, in which the transceiver transmits, to a first network, a first request message for receiving paging of a second network, receives, from the first network, a first response message as a response to the first request message, and monitors, by the processor, the second network or switches to the second network to receive the paging from the second network based on the first response message, and the terminal is in a registered state in relation to the first network and the second network, and in a connected state in relation to the first network.

Advantageous Effects

According to the present disclosure, in a wireless communication system, a terminal may efficiently receive a plurality of paging signals in a collision occasion between the paging signals simultaneously received from a plurality of networks.

Effects which may be achieved by the present disclosure are not limited to the above-mentioned effects. That is, other objects that are not mentioned may be obviously understood by those skilled in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram an AI device 100 according to an embodiment of the present disclosure.

FIG. 2 is a diagram illustrating an AI server 200 according to an embodiment of the present disclosure.

FIG. 3 is a diagram illustrating an AI system 1 according to an embodiment of the present disclosure.

FIG. 4 is a diagram illustrating various reference points.

FIG. 5 is a diagram illustrating one example of a network structure of an evolved universal terrestrial radio access network (E-UTRAN) to which the present disclosure may be applied.

FIG. 6 is an exemplary diagram illustrating an architecture of a general E-UTRAN and EPC.

FIG. 7 is a diagram illustrating a structure of a radio interface protocol in a control plane between a UE and eNB.

FIG. 8 is an exemplary diagram illustrating a structure of a radio interface protocol in a user plane between a UE and an eNB.

FIG. 9 is a diagram illustrating an architecture of a general NR-RAN.

FIG. 10 is a diagram illustrating a functional separation of a general NG-RAN and 5GC.

FIG. 11 is a diagram illustrating an example of a general architecture of 5G.

FIG. 12 is a diagram illustrating an embodiment to which the present disclosure may be applied.

FIG. 13 is a diagram illustrating an embodiment to which the present disclosure may be applied.

FIG. 14 is a diagram illustrating an embodiment to which the present disclosure may be applied.

FIG. 15 is a diagram illustrating an embodiment to which the present disclosure may be applied.

FIG. 16 is a flowchart according to an embodiment of a terminal to which the present disclosure may be applied.

FIG. 17 is a block configuration diagram of a communication device according to an embodiment of the present disclosure.

FIG. 18 is a block configuration diagram of a communication device according to an embodiment of the present disclosure.

FIG. 19 illustrates a structure of a radio interface protocol in a control plane between a UE and eNodeB.

MODE FOR DISCLOSURE

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present disclosure, well-known structures and devices may be omitted, or may be shown in a block diagram form centering on core capabilities of each structure and device.

Description of Terms in this Specification

A base station in this document is regarded as a terminal node of a network, which performs communication directly with a UE. In this document, particular operations regarded to be performed by the base station may be performed by an upper node of the base station depending on occasions. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following description are provided to aid understanding of the present disclosure, and the use of these specific terms may be changed to other forms within the scope of the technical spirit of the present disclosure.

The technology described below may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), etc. The CDMA may be implemented with a radio technology such as universal terrestrial radio access (UTRA) or CDMA-2000. The TDMA may be implemented with a radio technology such as global system for mobile communications (GSM)/ general packet ratio service (GPRS)/enhanced data rate for GSM evolution (EDGE). The OFDMA may be implemented with a radio technology such as IEEE 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

Embodiments of the present disclosure may be supported by standard documents disclosed in at least one of wireless access systems IEEE 802, 3GPP and 3GPP2. That is, in order to clearly reveal the technical idea of the present disclosure among the embodiments of the present disclosure, steps or parts not described may be supported by the above documents. In addition, all terms disclosed in the present document may be described by the standard document.

For clarity of explanation, 3GPP LTE/LTE-A is mainly described, but the technical features of the present disclosure are not limited thereto.

Terms that may be used in the present document are defined as follows.

IP multimedia subsystem (IMS) or IP multimedia core network subsystem): Architectural framework for providing standardization for delivering voice or other multimedia services over IP.

Universal mobile telecommunications system (UMTS): Global system for mobile communication (GSM)-based 3rd generation mobile communication technology developed by 3GPP Evolved packet system (EPS): Network system including an evolved packet core (EPC) which is an Internet protocol (IP)-based packet switched core network and an access network such as LTE and UTRAN. The EPS is an evolved form of the UMTS network.

NodeB: Base station of a UMTS network. The NodeB is installed outdoors and coverage thereof is a macro cell scale.

eNodeB: Base station of an EPS network. The eNodeB is installed outdoors and coverage thereof is a macro cell scale.

Home NodeB: Base station of a UMTS network, and the Home NodeB is installed indoors and the coverage thereof is microcell scale.

Home eNodeB: Base station for an EPS network, and the Home eNodeB is installed indoors and the coverage thereof is a microcell scale.

Terminal (User Equipment): User equipment. The terminal may be referred to as a terminal, a mobile equipment (ME), a mobile station (MS), or the like. In addition, the terminal may be a portable device such as a notebook computer, a mobile phone, a personal digital assistant (PDA), a smart phone, a multimedia device, or the like, or may be a non-portable device such as a personal computer (PC) or vehicle-mounted device. In MTC-related content, the term terminal or terminal may refer to an MTC terminal.

Machine type communication (MTC): Communication performed by machines without human intervention. The MTC may also be referred to as machine to machine (M2M) communication.

MTC terminal (MTC UE or MTC device or MTC device): A terminal (e.g., vending machine, meter reader, etc.) that has a communication function through a mobile communication network (e.g., communication with an MTC server through PLMN) and performs an MTC function.

Radio access network (RAN): Node B in the 3GPP network and radio network controller (RNC) for controlling the NodeB, a unit including the eNodeB. The RAN exists at a terminal end and provides a connection to a core network.

Home location register (HLR)/Home subscriber server (HSS): Database having subscriber information in the 3GPP network. The HSS may perform functions such as configuration storage, identity management, and user state storage.

Public land mobile network (PLMN): Network configured for the purpose of providing mobile communication services to individuals. The PLMN may be configured to be divided for each operator.

Non-access stratum (NAS): Functional layer for transmitting and receiving signaling and traffic messages between a UE and a core network in the UMTS and EPS protocol stacks. A main function of the NAS is to support the mobility of the UE and to support a session management procedure for establishing and maintaining an IP connection between the UE and the PDN GW.

Service capability exposure function (SCEF): Entity in the 3GPP architecture for service capability exposure that provides a means for securely exposing the services and capabilities provided by the 3GPP network interface.

Mobility management entity (MME): Network node of the EPS network that performs mobility management and session management functions Packet data network gateway (PDN-GW): Network node of the EPS network that performs UE IP address assignment, packet screening and filtering, and charging data collection Serving gateway (serving GW): Network node of the EPS network that performs functions such as mobility anchor, packet routing, idle mode packet buffering, and triggering paging of the MME to the UE Policy and charging rule function (PCRF): Node of the EPS network that performs policy decision to dynamically apply QoS and charging policies differentiated for each service flow Open mobile alliance device management (OMA DM): Protocol designed to manage mobile devices such as cell phones, PDAs, and portable computers and performing functions such as device configuration, firmware upgrade, and error report.

Operation administration and maintenance (OAM): Set of network management functions that provide network fault indication, performance information, and data and diagnostic functions.

Packet data network (PDN): Network in which a server supporting a specific service (e.g., MMS server, WAP server, etc.) is located.

PDN connection: Connection from the terminal to the PDN, that is, association (connection) between the terminal expressed by the IP address and the PDN expressed by the APN EPS mobility management (EMM): Sub-layer of the NAS layer, and the EMM may be in "EMM-Registered" or "EMM-Deregistered" state depending on whether the UE is network attached or detached.

EMM connection management (ECM) connection: Signaling connection for exchange of the NAS message established between the UE and the MME. The ECM connection is a logical connection composed of an RRC connection between the UE and the eNB and an S1 signaling connection between the eNB and the MME. When the ECM connection is established/terminated, the RRC and S1 signaling connections are also established/terminated. The established ECM connection means having an RRC connection established with the eNB to the UE, and means having an S1 signaling connection established with the eNB to the MME. Depending on whether a NAS signaling connection, that is, an ECM connection is established, the ECM may have a status of "ECM-Connected" or "ECM-Idle".

Access-stratum (AS): Including the protocol stack between the UE and the wireless (or access) network, and being responsible for data and network control signal transmission.

NAS configuration management object (MO): Management object (MO) used in the process of setting parameters related to NAS functionality to the UE.

Packet data network (PDN): Network in which a server supporting a specific service (e.g., multimedia messaging service (MMS) server, wireless application protocol (WAP) server, etc.) is located.

PDN connection: Logical connection between the UE and the PDN, expressed by one IP address (one IPv4 address and/or one IPv6 prefix).

Access point name (APN): Character string that refers to or distinguishes a PDN. In order to access a requested service or network, the APN goes through a specific P-GW, and means a name (string) predefined in the network to find this P-GW (e.g., internet.mnc012.mcc345.gprs).

Access network discovery and selection function (ANDSF): Single network entity, and providing a policy that allows the UE to discover and select available access for each operator.

EPC path (or infrastructure data path): User plane communication path through EPC.

E-UTRAN radio access bearer (E-RAB): Refer to the concatenation of the S1 bearer and the corresponding data radio bearer. When the E-RAB exists, there is a one-to-one mapping between the E-RAB and the EPS bearer of the NAS.

GPRS tunneling protocol (GTP): Group of IP-based communications protocols used to carry general packet radio service (GPRS) within GSM, UMTS and LTE networks. Within the 3GPP architecture, GTP and Proxy Mobile IPv6-based interfaces are specified on various interface points. GTP may be decomposed into several protocols (e.g., GTP-C, GTP-U and GTP'). GTP-C is used within the GPRS core network for signaling between gateway GPRS support nodes (GGSN) and serving GPRS support nodes (SGSN). In the GTP-C, the SGSN allows activating a session for a user (e.g., activates a PDN context), deactivating the same session, adjusting the quality of service parameters, or updating a session for a subscriber who has just operated from another SGSN. GTP-U is used to carry user data within the GPRS core network and between the radio access network and the core network.

Cell as a radio resource: The 3GPP LTE/LTE-A system uses the concept of a cell to manage radio resources, and a cell associated with a radio resource is separated from a cell of a geographic area. A "cell" associated with a radio resource is defined as a combination of downlink resources (DL resources) and uplink resources (UL resources), that is, a combination of a DL carrier and a UL carrier. The cell may be configured as a DL resource alone or a combination of a DL resource and a UL resource. When carrier aggregation is supported, linkage between a carrier frequency of a DL resource and a carrier frequency of a UL resource may be indicated by system information. Here, the carrier frequency means a center frequency of each cell or carrier. In particular, a cell operating on a primary frequency is referred to as a primary cell (Pcell), and a cell operating on a secondary frequency is referred to as a secondary cell (Scell). Scell refers to a cell that may be configured after radio resource control (RRC) connection establishment is made and may be used to provide additional radio resources. According to the capabilities of the UE, the Scell may form a set of serving cells for the UE together with the Pcell. In the case of a UE that is in the RRC_CONNECTED state but does not configure carrier aggregation or does not support carrier aggregation, there is only one serving cell configured only with Pcell. On the other hand, a "cell" of a geographic area may be understood as coverage in which a node may provide a service using a carrier, and a "cell" of a radio resource is associated with a bandwidth (BW) that is a frequency range configured by the carrier. The downlink coverage, which is the range in which a node may transmit a valid signal, and the uplink coverage, which is the range in which a valid signal may be received from the UE, depend on the carrier carrying the corresponding signal, so the coverage of the node is also associated with the coverage of the "cell" that the node uses. Therefore, the term "cell" may be used to mean sometimes coverage of a service by a node, sometimes a radio resource, and sometimes a range in which a signal using the radio resource may reach with effective strength.

The EPC is a key element of system architecture evolution (SAE) to improve the performance of 3GPP technologies. The SAE corresponds to a research task to determine a network structure that supports mobility between various types of networks. The SAE aims to provide an optimized packet-based system, for example, support various radio access technologies based on IP and provide improved data transmission capability.

Specifically, the EPC is a core network of an IP mobile communication system for a 3GPP LTE system, and may support packet-based real-time and non-real-time services. In the existing mobile communication system (i.e., the 2nd or 3rd generation mobile communication system), the function of the core network is configured through two distinct sub-domains: circuit-switched (CS) for voice and packet-switched (PS) for data. However, in the 3GPP LTE system, which is the evolution of the 3G mobile communication system, sub-domains of CS and PS are unified into one IP domain. That is, in the 3GPP LTE system, the connection between the UE and the UE having IP capability may be made through an IP-based base station (e.g., evolved Node B (eNodeB)), EPC, application domain (e.g., IP multimedia subsystem (IMS)). That is, the EPC is an essential structure for implementing an end-to-end IP service.

The EPC may include various components, and FIG. 1 illustrates a serving gateway (SGW), a packet data network gateway (PDN GW), mobility management entity (MME), and a serving general packet radio service (GPRS) supporting node (SGSN), and an enhanced packet data gateway (ePDG) that correspond to the components.

The SGW (or S-GW) is an element that functions as a boundary point between the radio access network (RAN) and the core network and maintains a data path between the eNB and the PDN GW. In addition, when the UE moves over an area served by the eNB, the SGW serves as a local mobility anchor point. That is, packets may be routed through the SGW for mobility in evolved-universal mobile telecommunications system (UMTS) terrestrial radio access network (E-UTRAN) defined after 3GPP Release-8). In addition, the SGW may serve as an anchor point for mobility with other 3GPP networks (RANs defined before 3GPP Release-8, for example, UTRAN or global system for mobile communication (GSM)/enhanced data rates for global evolution (EDGE) radio access network (GERAN).

The PDN GW (or P-GW) corresponds to the termination point of the data interface towards the packet data network. The PDN GW may support policy enforcement features, packet filtering, charging support, and the like. In addition, the PDN GW may serve as an anchor point for mobility management between 3GPP networks and non-3GPP networks (e.g., untrusted networks such as interworking wireless local area network (I-WLAN), trusted networks such as code division multiple access (CDMA) networks or WiMax).

Hereinafter, the present disclosure will be described based on the terms defined above.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

The present disclosure described below can be implemented by combining or modifying respective embodiments to meet the above-described requirements of 5G.

The following describes in detail technical fields to which the present disclosure described below is applicable.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth?, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot to which the Disclosure May be Applied

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

AI+Self-Driving to which the Disclosure May be Applied

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

AI+XR to which the Disclosure May be Applied

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

AI+Robot+Self-Driving to which the Disclosure May be Applied

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR to which the Disclosure May be Applied

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR to which the Disclosure May be Applied

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

5G System Architecture to which this Specification May be Applied

The 5G system is an advanced technology from the 4th generation LTE mobile communication technology, and supports extended LTE (eLTE), non-3GPP (e.g., WLAN) access as an extended technology of new radio access technologies (radio access technology (RAT)) and long term evolution (LTE).

The 5G system is defined as service-based, and the interaction between network functions (NF Network Functions) in the architecture for the 5G system may be represented in two ways as follows.

Reference point representation (representation) point-to-point between two NFs (e.g., AMF and SMF) represents the interaction between NF services in the NFs described by the reference point (e.g., N11).

Network functions (e.g., AMF) in the service-based representation control plane (control plane (CP)) allow other authenticated network functions to access its service. This representation also includes a point-to-point reference point, if necessary.

General 3GPP System

FIG. 4 is a diagram illustrating various reference points.

The example of a network structure of FIG. 4 illustrates that the SGW and the PDN GW are configured as separate gateways, but the two gateways may be implemented according to a single gateway configuration option.

The MME is an element that performs access to a network connection of a UE and signaling and control functions for supporting the assignment, tracking, paging, roaming, handover, etc. of network resources. The MME controls control plane functions related to subscriber and session management. The MME manages many eNBs and performs signaling for selecting a conventional gateway for handover for another 2G/3G network. Furthermore, the MME performs functions, such as security procedures, terminal-to-network session handling, and idle terminal location management.

The SGSN handles all packet data, such as the mobility management and authentication of a user for another 3GPP network (e.g., GPRS network).

The ePDG acts as a security node for an untrusted non-3GPP network (e.g., I-WLAN, WiFi hotspot).

As described with reference to FIG. 4, a UE having an IP capability may access an IP service network (e.g., IMS) provided by a service provider (i.e., operator) via various elements within the EPC based on non-3GPP access in addition to 3GPP access.

Also, for example, reference points such as S1-U and S1-MME may connect two functions existing in different functional entities. In the 3GPP system, a conceptual link that connects two functions present in different function entities of the E-UTRAN and the EPC is defined as a reference point. Table 1 lists reference points illustrated in FIG. 4. In the examples of Table 1, various reference points may be present depending on a network structure.

FIG. 5 is an exemplary diagram of common architecture of the E-UTRAN and the EPC.

The E-UTRAN system is an evolved system from the existing UTRAN system, and may be, for example, a 3GPP LTE/LTE-A system. Communication networks are widely placed to provide various communication services such as voice (e.g. voice over internet protocol (VoIP)) via IMS and packet data.

Referring to FIG. 5, an E-UMTS network includes an E-UTRAN, an EPC, and one or more UEs. The E-UTRAN is composed of eNBs that provide a control plane and a user plane protocol to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs functions such as context delivery between eNBs, control of a user plane tunnel between a source eNB and a target eNB, delivery of handover-related messages, and uplink load management.

The eNB is connected to the terminal through a radio interface and to an evolved packet core (EPC) through an S1 interface.

An S1 user plane interface (S1-U) is defined between the eNB and the serving gateway (S-GW). An S1 control plane interface (S1-MME) is defined between the eNB and the mobility management entity (MME). The S1 interface performs an evolved packet system (EPS) bearer service management function, a non-access stratum (NAS) signaling transport function, network sharing, and an MME load balancing function. The S1 interface supports many-to-many-relation between the eNB and an MME/S-GW.

TABLE 1

| Reference point | Description |
| --- | --- |
| S1-MME | Reference point for the control plane protocol between E-UTRAN and MME) |
| S1-U | Reference point between E-UTRAN and Serving GW for the per bearer the user plane tunneling and inter eNodeB path switching during handover |
| S3 | It enables user and bearer information exchange for inter 3GPP access network mobility in idle and/or active state. This reference point can be used intra-PLMN or inter-PLMN (e.g., in the case of Inter-PLMN HO) |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if Serving GW needs to connect to a non-collocated the PDN GW for the required the PDN connectivity. |
| S11 | Reference point for control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

S2a and S2b among the reference point illustrated in FIG. 4 correspond to non-3GPP interfaces. S2a is a reference point that provides the user plane with related control and mobility support between trusted non-3GPP access and the PDN GW. S2b is a reference point that provides the user plane with related control and mobility support between an ePDG and the PDN GW.

The MME can perform various functions, such as NAS signaling security, access stratum (AS) security control, core network (CN) inter-node (Inter-ON) signaling to support mobility between 3GPP access networks, idle mode UE reachability (including performance and control of paging retransmission), tracking area identity (TAI) management (for idle and active mode terminals), PDN GW and SGW selection, MME selection for handover in which MME is changed, SGSN selection for handover to 2G or 3G 3GPP access network, roaming, authentication, bearer management functions including dedicated bearer establishment, and supporting the transmission of public warning system (PWS) (including earthquake and tsunami warning system (ETWS) and commercial mobile alert system (CMAS)) messages.

FIG. 6 is an exemplary diagram illustrating architecture of a general E-UTRAN and EPC.

As shown in FIG. 6, the eNB may perform functions for routing to the gateway while the Radio Resource Control (RRC) connection is active, scheduling and transmitting of paging messages, scheduling and transmitting of broadcasting channel (BCH), dynamic allocation of resources in the uplink and downlink to the UE, configuration and provision for measurement of the eNB, radio bearer control, radio admission control, and connection mobility control. In the EPC, paging occasion, LTE_IDLE state management, ciphering of the user plane, SAE bearer control, ciphering of NAS signaling and integrity protection functions may be performed.

Annex J of 3GPP TR 23.799 shows various architectures combining 5G and 4G. 3GPP TS 23.501 shows an architecture using NR and NGC.

FIG. 7 is an exemplary diagram illustrating a structure of a radio interface protocol in a control plane between a UE and an eNB, and FIG. 8 is an exemplary diagram illustrating the structure of a radio interface protocol in a user plane between a UE and an eNB.

The radio interface protocol is based on a 3GPP radio access network standard. The radio interface protocol is horizontally composed of a physical layer, a data link layer and a network layer, and is vertically divided into a user plane for data information transmission and a control plane for control signal delivery.

The protocol layers may be divided into an L1 (first layer), an L2 (second layer), and an L3 (third layer) based on the lower three layers of an open system interconnection (OSI) reference model widely known in a communication system.

In the following, each layer of the radio protocol of the control plane shown in FIG. 7 and the radio protocol of the user plane shown in FIG. 8 will be described.

The physical layer, that is, the first layer, provides information transfer service using a physical channel. The physical layer has been connected to a medium access control layer placed on the upper side through a transport channel. Data between the medium access control layer and the physical layer is transferred through the transport channel. Furthermore, data is transferred through a physical channel between different physical layers, that is, physical layers between the transmission side and the reception side.

The physical channel is composed of several subframes on a time axis and several subcarriers on a frequency axis. In this case, one subframe is composed of a plurality of OFDM symbols and a plurality of subcarriers on the time axis. One subframe is composed of a plurality of resource blocks. One resource block is composed of a plurality of OFDM symbols and a plurality of subcarriers. A transmission time interval (TTI), that is, a unit time during which data is transmitted, is 1 ms corresponding to 1 subframe.

The physical channels present in the physical layers on the transmission side and the reception side may be divided into a physical downlink shared channel (PDSCH) and a physical uplink shared channel (PUSCH), that is, data channels, and a physical downlink control channel (PDCCH), a physical control format indicator channel (PCFICH), a physical Hybrid-ARQ indicator channel (PHICH), and a physical uplink control channel (PUCCH), that is, control channels, according to 3GPP LTE.

Several layers are present in the second layer. First, the medium access control (MAC) layer of the second layer functions to map various logical channels to various transport channels, and also acts as logical channel multiplexing for mapping several logical channels to one transport channel. The MAC layer has been connected to a RLC layer, that is, an upper layer, through a logical channel. The logical channel is basically divided into a control channel that transmits information of the control plane and a traffic channel that transmits information of the user plane, depending on the type of transmitted information.

The radio link control (RLC) layer of the second layer functions to adjust the size of data, received from an upper layer, through segmentation and concatenation so that the data is suitable for a lower layer to transmit the data in a radio interval.

The packet data convergence protocol (PDCP) layer of the second layer performs a header compression function for reducing the size of an IP packet header having a relatively large size and containing unnecessary control information in order to efficiently transmit the IP packet, such as IPv4 or IPv6, in a radio interval having a small bandwidth when transmitting the IP packet. Furthermore, in the LTE system, the PDCP layer also performs a security function, which is composed of ciphering for preventing third party data wiretapping and integrity protection for preventing a third party data manipulation.

The radio resource control (hereinafter abbreviated as an ?RRC?) layer located at the top of the third layer is defined in only the control plane, is related to a configuration, re-configuration and release of radio bearers (hereinafter abbreviated as ?RB?), and is responsible for control of the logical channel, the transport channel and the physical channel. In this case, the RB means service provided by the second layer for data transfer between a UE and an E-UTRAN.

If an RRC connection is established between the RRC layer of a UE and the RRC layer of a radio network, the UE is in an RRC connected mode. If not, the UE is in an RRC idle state.

Hereinafter, the RRC state and RRC connection method of a UE is described. The RRC state means whether the RRC of the UE has been logically connected to the RRC of the E-UTRAN. A case where the RRC of the UE is connected to the RRC of the E-UTRAN is called the RRC_CONNECTED state. A case where the RRC of the UE is not connected to the RRC of the E-UTRAN is called the RRC_IDLE state. A UE in the RRC_CONNECTED state has an RRC connection, and thus an E-UTRAN may check the presence of the UE in a cell unit. Accordingly, the E-UTRAN may effectively control the UE. In contrast, an E-UTRAN cannot check the presence of a UE in the RRC_IDLE state. A core network manages the UE in a tracking area (TA) unit, that is, an area unit greater than a cell. That is, whether the UE in the RRC_IDLE state is present has only to be checked in an area unit greater than a cell. In order to receive common mobile communication service, such as voice or data, the corresponding UE needs to make a transition to the RRC_CONNECTED state. Each TA is identified based on a tracking area identity (TAI). A UE may configure a TAI through a tracking area code (TAC), that is, information broadcasted by a cell.

When a user first turns on a UE, the UE first searches for a proper cell, sets up an RRC connection with a corresponding cell, and registers its information with a core network. Thereafter, the UE stays in the RRC_IDLE state. The UE in the RRC_IDLE state (re)selects a cell, if necessary, and checks system information or paging information. This is called that the UE camps on the cell. When it is necessary to set up an RRC connection, the UE in the RRC_IDLE state establishes RRC and an RRC connection with an E-UTRAN through an RRC connection procedure and shifts to the RRC_CONNECTED state. A case where the UE in the RRC_IDLE state needs to set up an RRC connection includes several types. The types may include that the UE requires a call attempt, a data transmission attempt, etc. of a user or requires the transmission of a corresponding response message, etc. when receiving a paging message from the E-UTRAN, for example.

A non-access stratum (NAS) layer located over the RRC layer performs functions, such as session management and mobility management.

Below, the NAS layer shown in FIG. 7 will be described in detail.

An evolved session management (ESM) belonging to the NAS layer is responsible for control that enables a UE to use PS service from a network by performing functions, such as default bearer management and dedicated bearer management. A default bearer resource is characterized in that it is assigned by a specific packet data network (PDN) when the network is accessed upon first access to the network. In this case, the network assigns an IP address available for a UE so that the UE can use data service and assigns QoS of a default bearer. In LTE, two types of a bearer having a guaranteed bit rate (GBR) QoS characteristic that guarantees a specific bandwidth for data transmission/reception and a non-GBR bearer having the best effort QoS characteristic without guaranteeing a bandwidth are supported. In the case of a default bearer, a non-GBR bearer is assigned. In the case of a dedicated bearer, a bearer having a QoS characteristic of a GBR or non-GBR may be assigned.

A bearer assigned to a UE by a network is called an evolved packet service (EPS) bearer. When assigning the EPS bearer, the network assigns one ID. This is called an EPS bearer ID. One EPS bearer has QoS characteristics of a maximum bit rate (MBR) or/and a guaranteed bit rate (GBR).

FIG. 9 is a diagram illustrating architecture of a general NR-RAN.

Referring to FIG. 9, an NG-RAN node may be one of the following.

gNB providing NR user plane and control plane protocols towards the UE; or ng-eNB providing E-UTRA user plane and control plane protocols towards the UE.

The gNB and the ng-eNB are connected to each other through an Xn interface. In addition, the gNB and ng-eNB are connected to access and mobility management functions (AMF) through the NG interface to 5GC, in more detail, through the NG-C interface, and user plane functions (UPF) through the NG-U interface (See 3GPP TS 23.501 [3]).

For reference, the architecture and F1 interface for functional separation are defined in 3GPP TS 38.401 [4].

FIG. 10 is an exemplary diagram illustrating functional separation between a general NG-RAN and 5GC.

Referring to FIG. 10, yellow boxes represent logical nodes and white boxes represent main functions.

The gNB and ng-eNB host the following functions.

Radio resource management function: radio bearer control, radio approval control, access mobility control, dynamic resource allocation for UE in both uplink and downlink (scheduling)

IP header compression, encryption and data integrity protection;

If routing for the AMF cannot be determined from information provided by the UE, the AMF is selected from the attached file of IMT-2000 3GPP-UE;

Routing of user plane data to UPF;

Delivery of control plane information to the AMF;

Connection configuration and release;

Paging message scheduling and transmission

System broadcasting information scheduling and transmission (provided by the AMF or OAM)

Measurement and measurement report configuration for mobility and scheduling

Display of uplink transmission level packets

Session management;

Network slicing support;

QoS flow management and mapping for data radio bearers

Support of UE in RRC_INACTIVE state

NAS message distribution function;

Radio access network sharing;

Double connection;

Close linkage between NR and E-UTRA

The AMF hosts the following main functions (see 3GPP TS 23.501 [3]).

NAS signal termination;

NAS signal security;

AS security control;

Signal transmission between CN nodes for movement between 3GPP access networks;

Idle mode UE connectivity (including paging retransmission control and execution)

Registration area management;

Supports mobility within and between systems

Access authentication;

Granting access rights including checking roaming rights;

Mobility management control (subscription and policy)

Support for network slicing;

Select SMF

The UPF hosts the following main functions (see 3GPP TS 23.501 [3]).

Anchor points for Intra-/Inter-RAT mobility (if applicable)

External PDU session point interconnected to the data network

Packet routing & forwarding;

Packet inspection and user plane part of policy rule enforcement

Traffic usage report;

Uplink classifier to support the flow of traffic to the data network

A branch point for supporting multi-homed PDU sessions;

QoS processing for user plane (e.g. packet filtering, gate, UL/DL speed enforcement)

Uplink traffic verification (SDF and QoS flow mapping)

Downlink packet buffering and downlink data notification triggering

Session management function (SMF) hosts the following main functions (see 3GPP TS 23.501 [3]).

Session management;
UE IP address allocation and management
UP function selection and control;
Traffic steering configuration for routing traffic to appropriate destinations in the UPF
Policy enforcement and partial control of QoS
Downlink Data Notification FIG. 11 illustrates an exemplary diagram of a general 5G architecture.

The following is a description of each reference interface and node in FIG. 11.

An access and mobility management function (AMF) supports functions of inter-CN node signaling for mobility between 3GPP access networks, termination of radio access network (RAN) CP interface N2, termination N1 of NAS signaling, registration management (registration area management), idle mode UE reachability, support of network slicing, SMF selection, and the like.

Some or all of the functions of the AMF can be supported in a single instance of one AMF.

A data network (DN) means, for example, operator services, internet access, or 3rd party service, etc. The DN transmits a downlink protocol data unit (PDU) to the UPF or receives the PDU transmitted from the UE from the UPF.

A policy control function (PCF) receives information on packet flow from an application server and provides functions of determining policies such as mobility management and session management.

A session management function (SMF) provides a session management function. If the UE has a plurality of sessions, the sessions can be respectively managed by different SMFs.

Some or all of the functions of the SMF can be supported in a single instance of one SMF.

A unified data management (UDM) stores subscription data of user, policy data, etc.

A user plane function (UPF) transmits the downlink PDU received from the DN to the UE via (R)AN and transmits the uplink PDU received from the UE to the DN via the (R)AN.

An application function (AF) interacts with 3GPP core network to provide services (e.g., to support functions of an application influence on traffic routing, network capability exposure access, interaction with policy framework for policy control, and the like).

A (radio) access network (R)AN collectively refers to a new radio access network supporting both evolved E-UTRA, that is an evolved version of 4G radio access technology, and a new radio (NR) access technology (e.g., gNB).

The gNB supports functions for radio resource management (i.e., radio bearer control, radio admission control, connection mobility control, and dynamic allocation of resources (i.e., scheduling) to the UE in uplink/downlink)

The UE means a user equipment.

In the 3GPP system, a conceptual link connecting between the NFs in a 5G system is defined as a reference point.

N1 is a reference point between the UE and the AMF, N2 is a reference point between the (R)AN and the AMF, N3 is a reference point between the (R)AN and the UPF, N4 is a reference point between the SMF and the UPF, N6 is a reference point between the UPF and the data network, N9 is a reference point between two core UPFs, N5 is a reference point between the PCF and the AF, N7 is a reference point between the SMF and the PCF, N24 is a reference point between the PCF in the visited network and the PCF in the home network, N8 is a reference point between the UDM and the AMF, N10 is a reference point between the UDM and the SMF, N11 is a reference point between the AMF and the SMF, N12 is a reference point between the AMF and an authentication server function (AUSF), N13 is a reference point between the UDM and the AUSF, N14 is a reference point between two AMFs, N15 is a reference point between the PCF and the AMF in case of non-roaming scenario, reference point between the PCF in the visited network and the AMF in case of roaming scenario, N16 is a reference point between two SMFs (reference point between the SMF in the visited network and the SMF in the home network in case of roaming scenario), N17 is a reference point between the AMF and 5G-equipment identity register (EIR), N18 is a reference point between the AMF and an unstructured data storage function (UDSF), N22 is a reference point between the AMF and a network slice selection function (NSSF), N23 is a reference point between the PCF and a network data analytics function (NWDAF), N24 is a reference point between the NSSF and the NWDAF, N27 is a reference point between a network repository function (NRF) in the visited network and the NRF in the home network, N31 is a reference point between NSSF in the visited network and NSSF in the home network, N32 is a reference point between security protection proxy (SEPP) in the visited network and SEPP in the home network, N33 is a reference point between a network exposure function (NEF) and the AF, N40 is a reference point between the SMF and a charging function (CHF), and N50 is a reference point between the AMF and a circuit bearer control function (CBCF).

Meanwhile, in FIG. 11, for convenience of description, a reference model for a case in which the UE accesses one DN using one PDU session is illustrated, but is not limited thereto.

In the following, for convenience of description, it is described based on the EPS system using an eNB, the eNB may be replaced with the 5G system using the gNB, the mobility management (MM) function of the MME may be replaced with the 5G system using the AMF, the SM function of S/P-GW may be replaced with the 5G system using the SMF, the user plane-related functions of the S/P-GW may be replaced with the 5G system using the UPF, etc.

In the above, the present disclosure has been described based on the EPS, but the content can be supported through similar operations through processes/messages/information for similar purposes in the 5G system.

Paging Method Defined in E-UTRA
Discontinuous Reception of Paging

The UE may use discontinuous reception (DRX) in idle mode to reduce power consumption. A single paging occasion (PO) is a subframe in which P-RNTI can be transmitted to the NB-IoT of NPDCCH (NarrowBand PDCCH) or MPDCCH (MTC PDCCH) that processes a paging message. In the P-RNTI transmitted on the MPDCCH case, PO refers to a start subframe of the MPDCCH repetition. When the P-RNTI is transmitted on the NPDCCH, the PO indicates the start subframe of the NPDCCH repetition unless the subframe determined by the PO is a valid NB-IoT downlink subframe. The first valid NB-IoT downlink subframe after the PO is a start subframe of NPDCCH repetition. The paging message is the same for both RAN initiated paging and CN initiated paging.

The UE initiates the RRC connection resumption procedure after receiving the RAN paging. When the UE receives CN-initiated paging in RRC_INACTIVE state, the UE moves to RRC_. It is Notified to the NAS.

One paging frame PF is one radio frame that may include one or more paging occasions. When using DRX, the UE only needs to monitor one PO per DRX cycle.

One paging narrowband (PNB) is one narrowband in which the UE performs paging message reception.

PF, PO and PNB are determined by the following Equation using the DRX parameters provided in the system information.

The PF is given by the following Equation $$\text{SFN mod } T = (T \text{ div } N)*(\text{UE\_ID mod } N) \qquad \text{[Equation 1]}$$

The index i_s indicating PO in the subframe pattern defined in 7.2 is derived from the following calculation.

$$i\_s = \text{floor}(\text{UE\_ID}/N) \text{ mod } Ns \qquad \text{[Equation 2]}$$

When the P-RNTI is monitored in the MPDCCH, the PNB is determined by the following equation.

$$\text{PNB} = \text{floor}(\text{UE\_ID}/(N*Ns)) \text{ mod } Nn \qquad \text{[Equation 3]}$$

When P-RNTI is monitored on NPDCCH, the UE supports paging configuration for non-anchor carrier, and the paging configuration for the non-anchor carrier is provided in system information, The paging carrier is determined by the paging carrier of the minimum index n (0≤n−1 Nn−1) satisfying Equation 4 below.

$$\text{floor}(\text{UE\_ID}/(N*Ns)) \text{ mod } W < W(0) + W(1) + \ldots + W(n) \qquad \text{[Equation 4]}$$

The DRX parameter of system information (SI) stored in the UE is locally updated in the UE whenever the DRX parameter value in the system information is changed. For example, when the UE does not have an IMSI when making an emergency call without USIM, the UE uses/applies the default UE_ID=0 in the above Equations related to PF, i_s and PNB.

The parameters used for calculation of PF, i_s, PNB and NB-IoT paging carrier are as follows.

T: DRX cycle of UE. Except for NB-IoT, when 512 UE-specific extended DRX values are configured by the upper layer as described in Chapter 7.3 of the standard document, T=512. Otherwise, that is, when allocated by a higher layer, T is determined as the shortest value among UE-specific DRX values and a basic DRX value broadcast as system information. When the UE-specific DRX is not configured by the higher layer, the default value applies. The UE-specific DRX does not apply to NB-IoT. When T is allocated by a higher layer in the RRC_INACTIVE state, T is determined by the shortest value among a RAN paging cycle, a UE-specific paging cycle, and a basic paging cycle.

nB: 4T, 2T, T, T/2, T/4, T/8, T/16, T/32, T/64, T/128, and T/256, and for NB-IoT, T/512 and T/1024.

N: Minimum value of T and nB

Ns: Maximum value of 1 and nB/T

Nn: The number of paging narrowband (for P-RNTI monitored on MPDCCH) or the paging carrier (for P-RNTI monitored on NPDCCH) provided in system information For UE_ID, it is determined as follows:

When the P-RNTI is monitored on the PDCCH, it is determined as IMSI mod 1024.

When the P-RNTI is monitored on the NPDCCH, it is determined as IMSI mod 4096.

When the P-RNTI is monitored on MPDCCH or the P-RNTI is monitored on NPDCCH, the UE supports paging for the non-anchor carrier, and the paging configuration for the non-anchor carrier is provided in the system information, IMSI mod 16384 is determined.

W(i): Weight for NB-IoT paging carrier i.
W: Sum of weights for all NB-IoT paging carriers (e.g., W=W(0)+W(1)+ . . . +W(Nn−1)).

The IMSI is given as a sequence of digits in the form of integers (0, . . . , 9) IMSI, in the formula above, the IMSI shall be interpreted as an integer in decimal, where The first digit given in the sequence represents the highest-order digit.

For example, in the calculation of IMSI=12 (digit1=1, digit2=2), this should be interpreted as "12", a decimal integer, not "1×16+2=18".

Subframe Patterns

FDD:

When the P-RNTI is transmitted on the PDCH or NPDCCH or when the P-RNTI is transmitted on the MPDCCH having a system bandwidth of 3 MHz or more, the PO is determined as shown in Table 2 below.

TABLE 2

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

When P-RNTI is transmitted on MPDCCH of 1.4 MHz and 3 MHz of system bandwidth, the PO is determined as shown in Table 3 below.

TABLE 3

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

TDD (all UL/DL configurations):—When the P-RNTI is transmitted on the PDCCH or the NPDCCH or when the P-RNTI is transmitted on the MPDCCH having a system bandwidth of 3 MHz or more, the PO is determined as shown in Table 4 below.

TABLE 4

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

When the P-RNTI is transmitted on the MPDCCH of 1.4 MHz and 3 MHz of system bandwidth, the PO is determined as shown in Table 5 below.

TABLE 5

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

Paging Method Defined in 5G-NR
Discontinuous Reception for Paging

To reduce power consumption, the UE can use discontinuous reception (DRX) in RRC_IDLE and RRC_INAC- TIVE states. The UE monitors the one paging occasion (PO) per DRX cycle. The PO is a set of PDCCH monitoring occasions, and may composed of multiple time slots (e.g., subframes or OFDM symbols) capable of transmitting paging DCI (TS 38.213 [4]). One paging frame (PF) is one radio frame, and may include one or more POs or a starting point of POs.

In multi-beam operation, the length of one PO is one period of beam sweeping, and the UE may assume that the same paging message is repeated in all beams of the entire pattern, and thus the beam selection for reception of the paging message depends on the UE implementation. The paging message is the same for both RAN initiated paging and CN initiated paging.

The UE initiates the RRC connection resumption procedure after receiving the RAN paging. When the UE receives CN-initiated paging in the RRC_INACTIVE state, the UE transitions to RRC_IDLE and informs the NAS of the corresponding information. The PF and the PO are determined in the following way:

The SFN for the PF is determined by Equation 5 below.

$$(SFN+PF\_offset) \bmod T = (T \div N)*(UE\_ID \bmod N) \quad [\text{Equation 5}]$$

An index (i_s) indicating the start of a series of PDCCH monitoring occasions for paging DCI is determined by Equation 6 below.

$$i\_s = \text{floor}(UE\_ID/N) \bmod Ns \quad [\text{Equation 6}]$$

If configured, the PDCCH monitoring status for paging is determined according to paging-SearchSpace and firstPDCCH-MonitoringOccashionOfPO defined in section 10 of TS 38.213 [4]. Otherwise, the PDCCH monitoring occasion for paging is determined according to a basic association. For example, the PDCCH monitoring occasion for paging is the same as the RMSI defined in section 13 of TS 38.213 [4].

For basic association, Ns is either 1 or 2. When Ns=1, there is only one PO starting at PF. When Ns=2, PO is in the first half frame (i_s=0) or the second half frame (i_s=1) of the PF.

In the case of a non-default connection (i.e., when paging-SearchSpace is used), the UE monitors the (i_s+1)-th PO where the first PO starts in the PF. The PDCCH monitoring occasion for paging that does not overlap with the uplink symbol is sequentially numbered from 0 starting from the first PDCCH monitoring occasion for paging in the PF. If firstPDCCH-MonitoringOccasionOfPO exists, i_s+first PO is a set up to 'S' consecutive PDCCH monitoring situations for paging from the PDCCH monitoring occasion indicated by firstPDCCH-MonitoringOccessionOfPO (e.g., i_s+first value of firstPDCCH-MonitoringOccessionOfPO). Otherwise, the i_s+first PO is a set of 'S' consecutive PDCCH monitoring occasions for paging starting from the i_s*Sth paging PDCCH monitoring occasion, where 'S' is the number of actually transmitted SSBs determined according to ssb-positionsInBurst of SystemInformationBlock1. The K-th PDCCH monitoring occasion for paging in the PO corresponds to the K-th transmission SSB.

The parameters used to calculate the PF and i_s are as follows.
- T: DRX cycle of UE. Here, when T is set by RRC or a higher layer, it is determined as the shortest value of a UE-specific DRX value and a basic DRX value broadcast as system information. When the UE-specific DRX is not configured by RRC or higher layers, the default value is applied to T.
- N: Total number of paging frames in T
- Ns: The number of paging events for one PF
- PF_offset: Offset used to determine the PF
- UE_ID: 5G-S-TMSI mod 1024

Parameters N, Ns, first-PDCCH-MonitoringOccashionOfPO, PF_offset and the length of the basic DRX Cycle are signaled in SIB1.

When the UE does not have 5G-S-TMSI (e.g., the UE has not yet registered with the network), the UE uses the basic identification information of UE_ID=0 in the equation related to PF, i_s.

5G-S-TMSI is a 48-bit long character string defined in TS 23.501 [10]. 5G-S-TMSI in the above Equation should be interpreted as a binary number in which the leftmost bit represents the most significant bit.

A lot of terminals supporting Multi-SIM are widespread, mainly in developing countries. In these countries, there are a large number of mobile operators that provide voice and data, and each operator has a different field of strength, so users separates, for example, a SIM card for an operator for voice communication and a SIM card for data communication, mounts a plurality of SIM cards in a terminal, and receives a service. In addition, in other cases, since each operator provides a service in different areas, a plurality of SIM cards may be mounted in order to receive a service more flexibly.

However, the LTE system and the NR system support numerous frequency bands, and accordingly, most terminals have functional limitations. That is, most of them have one modem and one AP, and only support a frequency band suitable for the region where each terminal is released. Otherwise, the size of the terminal is inevitably increased, and battery consumption is also increased, and the price of the terminal increases by mounting a plurality of modems.

As a way to solve this problem, a dual sim dual standby terminal is widely used. That is, by transferring a system corresponding to each SIM card while sharing one modem, the terminal supports two SIM cards at the same time. For example, when for the SIM card 1, the terminal should monitor the paging in system 1 corresponding to the SIM card 1 at intervals of 1 to 10 seconds, and for the SIM card 2, the terminal should monitor the paging of the SIM card 2 at intervals of 5 to 10 seconds, the terminal checks paging in system 1 at 1/11/21/31 seconds and checks paging in system 2 at 5/15/25/35 seconds through adjustment of the RF chain. In this way, the terminal can monitor paging from two systems/operators even if only one modem is used.

However, in the above method, if the cycle of paging is the same in the two systems or the offset of the paging is the same, a problem occurs. For example, in the above example, when the starting point of paging is 1 second to 10 seconds in the second system, paging is transmitted at the same time in the two systems. In this case, since the terminal cannot monitor paging from other systems at the same time due to hardware limitations, in this case, when the terminal is always monitoring one system while paging is transmitted from the other system, the terminal misses the paging. In particular, when the missed paging is an urgent service such as a voice call, the user experience deteriorates.

Accordingly, the present disclosure intends to provide a method for stably providing a service connected to each of the SIM cards in a terminal to which a plurality of SIM cards are connected.

In particular, in a occasion where the terminal uses a plurality of SIM cards, when there is communication in progress with respect to a system related to at least one SIM card, the present disclosure provides a method for allowing the terminal to properly receive notification of new communication or for minimizing the impact on user experience for a plurality of systems.

First Embodiment

First of all, the present disclosure provides a method in which in a situation in which a terminal uses a plurality of SIM cards installed, since there is an active communication service in progress for a system linked to a first SIM card, a terminal does not need to monitor a paging message or a similar signal, and for a system linked to a second SIM card, when there is no communication service in progress, but the terminal needs to receive a paging message, etc., the terminal may effectively monitor the communication service that is not in progress while effectively minimizing the change in the user experience for the communication service in progress.

For ease of explanation below, the following assumptions are made.
  A plurality of SIMs installed in the terminal are referred to as SIM1 and SIM2, respectively.
  The SIM1 is linked to system 1, PLMN1, and the SIM2 is linked to system 2, PLMN2
  For the system 1, the terminal is RRC_Connected, and in a state in which transmission and reception can be performed at any time, there is an ongoing service/traffic
  For the system 2, the terminal is in RRC_Idle and RRC_Inactive states, and in a state where transmission and reception may not be performed immediately, there is no service/traffic currently actively in progress.

Example 1 of First Embodiment

First, in a situation in which a terminal is provided with an ongoing communication service through system 1, it is intended to provide a method for reliably receiving notification of mobile-terminated traffic through system 2. To this end, the terminal transmits, to the system 2, information on when it should perform a paging-related operation to the system 2. For example, the terminal transmits information on the time related to its PO and PF related to the system 2 to the system 1. In addition, the system 1 receiving the information transmits downlink traffic to the terminal by avoiding the time period indicated by the information or allocates the uplink radio resource to the terminal in a section excluding the time section when allocating the uplink radio resource. Specifically, after the terminal transmits the time information as described above to the system, the terminal performs the traffic transmission/reception-related operations in the system 1, and in the time interval, the terminal transitions to the system 2, and uses PO/PF to check whether paging has come to itself, and then when there is paging, the system additionally performs the operation related thereto, and when it is confirmed that there is no paging, the system performs the operation related to the data transmission and reception in the system 1 again.

Preferably, in the above process, after the terminal transmits the related time information such as PO/PF in the system 2 to the system 1, the system 1 permits transition to system 2 during the time based on the information, or attempts to receive a paging from system 2 during the time period only when a response indicating that transmission/reception is not performed in relation to the time is received. In addition, when the information regarding the permission or response is not received in the system 1, the terminal does not attempt to operate in the system 2.

Preferably, in the process, after the terminal transmits the related time information such as the PO/PF in the system 2 to the system 1, when the system 1 does not perform scheduling from the system 1 to the terminal, or when the terminal receives information on when the terminal may perform an operation in another system without the monitoring system 1, the terminal attempts to receive the paging in the system 2 only in the time period indicated by the information, or performs the data transmission and reception in the system 2. In addition, when the information regarding the permission or response is not received in the system 1, the terminal does not attempt to operate in the system 2.

FIG. 12 illustrates an embodiment to which the present disclosure may be applied. An embodiment to which the present disclosure can be applied will be described with reference to FIG. 12 as follows.

The terminal performs registration in system 1 and is assigned an IP address (S1200).

The terminal performs registration in system 2 and is assigned an IP address (S1201).

The terminal transitions to RRC_Connected mode by transmitting a service request to system 1 to process traffic generated in the service configured to use the system 1, for example. In this process, in order to receive the paging related to the service set to use the system 2, the terminal has to leave the system 1 in order to receive the paging from the system 2, or transmits the information (hereinafter referred to as required gap time info), such as time when system 1 may not properly transmit/receive, to the system 1 (S1202).

The system 1 processes the required gap time info transmitted by the terminal in step 2 using subscription information and policy information of the terminal, and determines whether to allow it or apply other configurations. In accordance with this, when the terminal does not need to transmit/receive in the system 1, or when the terminal may leave the system 1 and perform a desired operation in the system 2, the terminal transmits the information (hereinafter, acknowledged gap information) to the terminal (S1203).

In S1203, when the acknowledged gap information is included, the terminal recognizes that the terminal may access the system 2 and perform the transmission/reception. Accordingly, except for the time specified in the acknowledged gap information, the system 1 performs the transmission and reception (S1204). In S1203, when the acknowledged gap information is not received or information such as rejection is received from system 1, the terminal recognizes that QoS is not supported when the terminal moves from the system 1 to the system 2.

In step 3, when the acknowledged gap information is included, the terminal recognizes that the terminal may access the system 2 and perform the transmission/reception. Accordingly, at the time specified in the acknowledged gap information, the terminal moves to the system 2 to determine whether there is paging and, if necessary, performs the transmission and reception (S1205). In S1203, when the acknowledged gap information is not received or information such as rejection is received from system 1, the terminal recognizes that QoS is not supported when the terminal moves from the system 1 to the system 2.

The following is an example of an implementation of an operation, a message, etc. presented in the present disclosure.

For example, the service request may be extended as follows. Alternatively, a new message or information for a similar purpose may be defined.

Service Request

This message is transmitted to the network by the UE to request the NAS signaling connection and the establishment of the radio and S1 bearers. This structure does not follow the structure of the standard layer 3 message.

Message type: SERVICE REQUEST
Significance: dual
Direction: UE to network

Table 6 illustrates the content of a SERVICE REQUEST message that can be applied in the present disclosure.

TABLE 6

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | KSI and sequence number | KSI and sequence number 9.9.3.19 | M | V | 1 |
| | Message authentication code (short) | Short MAC 9.9.3.28 | M | V | 2 |
| | Required Gap Information | Required Gap Information | | | |

Required Gap Information: When the UE needs time to monitor other systems than the current system, the UE shall include this IE. This information may include timing information that the UE should tune to other systems/networks.

Service Accept

1. Message Definition

This message is transmitted on the network in response to a service request message, an expired service request message, or a control plan service request message.

Message type: SERVICE ACCEPT
Significance: dual
Direction: network to UE

Table 7 illustrates the content of a SERVICE ACCEPT message that may be applied in the present disclosure.

TABLE 7

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Service accept message identity | Message type 9.8 | M | V | 1 |
| 57 | EPS bearer context status | EPS bearer context status 9.9.2.1 | O | TLV | 4 |
| 6B | T3448 value | GPRS timer 2 9.9.3.16A | O | TLV | 3 |
| | Acknowledged Gap Information | Acknowledged Gap Information | | | |

Acknowledged Gap Information: This IE indicates when the UE may monitor or switch to a system other than the current system. This information may include timing information that the UE should tune to other systems/networks.

Registration Request

1. Message Definition

A registration request message is transmitted to the AMF by the UE.

Message type: REGISTRATION REQUEST
Significance: dual
Direction: UE to network

Table 8 illustrates the content of a REGISTRATION REQUEST message that can be applied in the present disclosure.

TABLE 8

| IEI | Information Element | Type/Reference | Presence | Format | Length |
|---|---|---|---|---|---|
| | Extended protocol discriminator | Extended Protocol discriminator 9.2 | M | V | 1 |
| | Security header type | Security header type 9.3 | M | V | ½ |
| | Spare half octet | Spare half octet 9.5 | M | V | ½ |
| | Registration request message identity | Message type 9.7 | M | V | 1 |
| | 5GS registration type | 5GS registration type 9.11.3.7 | M | LV | 2 |
| | ngKSI | NAS key set identifier 9.11.3.32 | M | V | ½ |
| | Spare half octet | Spare half octet 9.5 | M | V | ½ |
| | 5GS mobile identity | 5GS mobile identity 9.11.3.4 | M | LV | 5-TBD |
| C- | Non-current native NAS key set identifier | NAS key set identifier 9.11.3.32 | O | TV | 1 |
| 10 | 5GMM capability | 5GMM capability 9.11.3.1 | O | TLV | 3-15 |
| 2E | UE security capability | UE security capability 9.11.3.54 | O | TLV | 4-10 |
| 2F | Requested NSSAI | NSSAI 9.11.3.37 | O | TLV | 4-74 |
| 52 | Last visited registered TAI | 5GS tracking area identity 9.11.3.8 | O | TV | 7 |
| 65 | S1 UE network capability | S1 UE network capability 9.11.3.48 | O | TLV | 4-15 |

TABLE 8-continued

| IEI | Information Element | Type/Reference | Presence | Format | Length |
|---|---|---|---|---|---|
| 40 | Uplink data status | Uplink data status 9.11.3.57 | O | TLV | 4-34 |
| 50 | PDU session status | PDU session status 9.11.3.44 | O | TLV | 4-34 |
| B- | MICO indication | MICO indication 9.11.3.31 | O | TV | 1 |
| 2B | UE status | UE status 9.11.3.56 | O | TLV | 3 |
| 2C | Additional GUTI | 5GS mobile identity 9.11.3.4 | O | TLV | TBD |
| 25 | Allowed PDU session status | Allowed PDU session status 9.11.3.13 | O | TLV | 4-34 |
| 60 | UE's usage setting | UE's usage setting 9.11.3.55 | O | TLV | 3 |
| TBD | Requested DRX parameters | DRX parameters 9.11.3.22 | O | TBD | TBD |
| 7C | EPS NAS message container | EPS NAS message container 9.11.3.24 | O | TLV-E | TBD |
| 7E | LADN indication | LADN indication 9.11.3.29 | O | TLV-E | 3-811 |
| 7B | Payload container | Payload container 9.11.3.39 | O | TLV-E | 4-65538 |
|  | Required Gap Information | Required Gap Information |  |  |  |

2. Non-Current Native NAS Key Set Identifier

When the UE performs a system-to-system change from S1 mode to N1 mode in 5GMM-CONNECTED mode and the UE uses the mapped 5G NAS security context to protect the REGISTRATION Request message, the UE has a valid non-current native 5G NAS security context If present, the UE shall include this IE.

3. Required Gap Information

When the UE needs time to monitor other systems than the current system, the UE shall include this IE. This information may include timing information that the UE should tune to other systems/networks.

5GS Registration Type

The purpose of the 5GS registration type information element is to indicate the type of registration requested.

The 5GS registration type information elements are coded as shown in Tables 9 and 10.

5GS registration type is a type 4 information element with a length of 3 octets.

Tables 9 and 10 are examples of 5GS registration type information elements to which the present disclosure may be applied.

TABLE 9

| 8 | 7 | 6 | 5 | 4 | 3 | 2 | 1 |  |
|---|---|---|---|---|---|---|---|---|
| \multicolumn{8}{l}{5GS registration type IEI} | octet 1 |
| \multicolumn{8}{l}{Length of 5GS registration type contents} | octet 2 |
| 0 Spare | 0 Spare | NG-RAN-RCU | FOR | SMS requested | \multicolumn{3}{l}{5GS registration type value} | octet 3 |

TABLE 10

5GS registration type value (octet 3, bits 1 to 3)

| Bits | | | |
|---|---|---|---|
| 3 | 2 | 1 | |
| 0 | 0 | 1 | initial registration |
| 0 | 1 | 0 | mobility registration updating |
| 0 | 1 | 1 | periodic registration updating |
| 1 | 0 | 0 | emergency registration |
| <u>1</u> | <u>0</u> | <u>1</u> | <u>Indicates that the UE want time gap where the UE can tune/monitor to other system/network than current one.</u> |
| 1 | 1 | 1 | reserved |

All other values are unused and shall be interpreted as "initial registration", if received by the network.

SMS over NAS transport requested (SMS requested) (octet 3, bit 4)

| Bit 4 | |
|---|---|
| 0 | SMS over NAS not supported |
| 1 | SMS over NAS supported |

Follow-on requestbit(FOR) (octet3, bit5)

| Bit 5 | |
|---|---|
| 0 | Nofollow-on requestpending |
| 1 | Follow-on requestpending |

TABLE 10-continued

NG-RAN Radio Capability Update(NG-RAN-RCU) (octet3, bit6)
Bit
6

| | |
|---|---|
| 0 | NG-RAN Radio Capability Update not needed |
| 1 | NG-RAN Radio Capability Update needed |

Bit 7 to 8 of octet 3 are spare and shall be coded as zero.
Bit 7 to 8 of octet 3 are spare and shall be coded as zero.

An example in which the terminal 1 transmits a message to the system 1 using a service request message or a registration message based on the NAS message has been described above, but since the system is constituted by the core network and a radio access network, the terminal may transmit and receive gap information for monitoring in this system 2 using an RRC message or a MAC message instead of a NAS message. In this case, since the information is processed in the RAN, the burden on the CN may be reduced. This is also valid in the following description.

However, at the time of S1205 of FIG. 12, the terminal attempts to receive paging at the calculated PO in the system 2. In this case, when the paging message is transmitted and its identifier is included in the paging message, the terminal should establish a connection with the network in the system 2. However, at this time, the terminal needs to perform the RACH process, the RRC process, and the NAS process. Therefore, when performing these operations, a lot of time is required, and more time may be required the time allowed to stay in the system 2 permitted by the acknowledged gap information indicated by the system or to operate after leaving system 1.

In this case, when the terminal operates in the system 2 and does not perform an operation in the system 1 for a predetermined time, the system 1 determines that an error has occurred for the terminal, and for example, The system may deteriorate the user experience by performing an operation such as deleting the context for the terminal.

Therefore, additionally, in the above process, when the terminal recognizes that paging has come to itself in the system 2, the terminal transitions to system 1 and additionally requests the system 1 for a time when the terminal may not operate in the system 1 or the time for itself to operate in the system 2. The system 1 transmits permission for this or allocates additional time. At this time, the terminal operates in the system 2 for the additionally allocated time.

Alternatively, the terminal may transmit a request to the system 1 to hold data transmission/reception for a while, and may receive permission for this.

FIG. 13 is a diagram illustrating an embodiment to which the present disclosure may be applied. In more detail, FIG. 13 is one of additional exemplary operations according to the operation of FIG. 12.

The terminal determines through S1205 that there is an identifier of its own in the received paging message, and accordingly recognizes that the terminal should additionally perform the RRC/NAS procedure with the system 2 (S1306).

(The two options are described simultaneously as A and B in the following Step.)

The terminal anticipates a time required to perform the procedure in the system 2, and transmits the time to the system 1 using a message such as Communication Control Request, and transmits additional required gap information on the time required in this regard (S1307A). The additional requirement gap information is required to transmit information such as when the terminal may not transmit/receive in the system 1 or until when the terminal may not allocate radio resources to the terminal.

Using the information received in S1307A, the system 1 returns to the terminal whether the terminal may leave system 1 for the time notified in S1307A or returns information on a time when the system 1 may move the terminal to another system or a time when the system 1 does not perform the transmission/reception to the terminal (S1308A).

In order to inform the system 1 that the terminal may not communicate with the system 1 or transmit and receive data, the terminal requests the system 1 to temporarily pause communication with itself (S1307B).

In accordance with S1307B, when the system 1 accepts the request to pause the communication of the terminal, the system 1 transmits the permission (S1308B).

After receiving permission to temporarily pause communication through S1308A or S1308B, the terminal transitions to the system 2 and performs the received paging response or data transmission/reception environment related operation (S1309).

When the operation of S1309 is finished, the terminal transitions back to the system 1, and based on the communication environment configuration made in the system 2, for communication with the system 2, the terminal transmits, to system 1, information related to the time when the terminal may not communicate with the system 1 or the time the terminal has to leave system 1 (S1310A).

Based on the information in S1310A, the network transmits, to the terminal, time information on whether to accept the terminal's request, when the terminal may omit transmission and reception to and from the system 1, or when movement to another system is permitted, or the like (S1311A).

Additional signaling and data transmission/reception to/from the system 2 may be performed. In the system 2, the terminal is first informed of the presence or absence of paging itself in wake-up-signal (WUS) or the PO of the calculated PF. Thereafter, when the presence of the paging is indicated, the paging is received using a radio resource designated by the PI-RNTI.

When the terminal completes the operation in the system 2, the terminal transitions back to system 1, and transmits a message to inform the system 1 that the terminal may perform the transmission/reception again (S1310B). In this process, as in step 10A, it is possible to additionally transmit the information on the time for which the user has data transmission/reception with system 1.

The system 1 uses the message in step 10B transmitted by the terminal, recognizing that the terminal has returned to system 1 and may perform data transmission/reception again, and resumes the necessary data transmission and reception. Based on the information in S1310B, the network transmits, to the terminal, time information on whether to accept the terminal's request, when the terminal may omit transmission and reception to and from the system 1, or when movement to another system is permitted, or the like (S1311B).

According to S1311A/S1311B, the terminal understands information on when the terminal may perform transmission/reception with system 1 and when the terminal should perform transmission/reception with the system 2, and operates accordingly.

The following is one example of a message and information element applicable to the present disclosure, and shows a case in which the above information is delivered to a MAC CE. RRC messages may be used in a similar manner MAC Header for DL-SCH, UL-SCH and MCH The size of the MAC header is variable and composed of the following fields.

LCID: Logical channel ID field identifies a logical channel instance of the corresponding MAC SDU or the corresponding MAC control element or padding type as described in Tables 11 and 12 for DL-SCH, UL-SCHm and MCH, respectively. There is one LCID field each for the MAC SDU, the MAC control element, or the padding included in the MAC PDU. In addition, one or two additional LCID fields are included in the MAC PDU when 1-byte or 2-byte padding is required but may not be achieved with padding at the end of the MAC PDU. When the LCID field is set to "10000", the LCID field will be an extra octet. The additional octet is present in the MAC PDU sub-header including the eLCID field, and this additional octet follows an octet including the LCID field. Except in the case of enhanced coverage, UEs of Category 0 and unicastFreqHoppingInd-r13 are indicated in the SI message BR version including SystemInformationBlock-Type2, and UEs that support frequency hopping for unicast UE should indicate LCID "01011", CCCH using frequency hop for unicast (BL UE supporting frequency hop for unicast indicates LCID "01100" that unicastFreqHoppingInd-r13 in the BR version of the SI message including SystemInformationBlockType2 uses.) Otherwise, the UE should indicate the CCCH using the LCID "00000". The LCID field size is 5 bits;

eLCID: The extended logical channel ID field identifies the type of the logical channel instance of the corresponding MAC SDU or the corresponding MAC control element as described in Table 12 for the DL-SCH and the UL-SCH, respectively. The size of the eLCID field is 6 bits;

L: The Length field indicates the length of the corresponding MAC SDU or variable size MAC control element in bytes. There is one L field per MAC PDU subheader except for the last subheader and subheader corresponding to the MAC control element having a fixed size. The size of the L field is indicated by the F field and the F2 field;

F: The Format field indicates the size of the length field shown in Table 6.2.1-3. There is one F field per MAC PDU subheader, except for the last subheader and subheader corresponding to the MAC control element having the fixed size, except when F2 is set to 1. The size of the F field is 1 bit. When the F field is included, the value of the F field is set to 0 when the size of the MAC SDU or the variable size MAC control element is less than 128 bytes, otherwise the value of the F field is set to 1.

F2: The Format2 field indicates the size of the length field as shown in Table 6.2.1-3. There is one F2 field per MAC PDU subheader. The size of the F2 field is 1 bit. When the size of the MAC SDU or variable-size MAC control element is greater than 32767 bytes and the corresponding subheader is not the last subheader, the value of the F2 field is set to 1, otherwise the value of the F2 field is set to 0.

E: Extension field is a flag indicating whether there are more fields in the MAC header. The E field is set to "1" to indicate at least another set of R/F2/E/LCID fields.

The E field is set to "0" to indicate that the MAC SDU and MAC control element or the padding starts at the next byte.

R: Reserved bit sets to "0".

The MAC header and subheader are octal aligned.

Table 11 and Table 12 are examples of LCID values of DL-SCH to which the present disclosure may be applied

TABLE 11

| Codepoint/Index | LCID values |
| --- | --- |
| 00000 | CCCH |
| 00001-01010 | Identity of the logical channel |
| 01011-01111 | Reserved |
| 10000 | Extended logical channel ID field |
| 10001 | Reserved |
| 10010 | Activation/Deactivation of PDCP Duplication |
| 10011 | Hibernation (1 octet) |
| 10100 | Hibernation (4 octets) |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

Note:
Except for padding and SC-PTM Stop indication, both SC-MCCH and SC-MTCH cannot multiplex with other logical channels of the same MAC PDU

TABLE 12

| Codepoint | Index | LCID values |
| --- | --- | --- |
| 000000-000110 | 32-38 | Identity of the logical channel |
| 000111 | 39 | Communication control request |
| 001000 | 40 | Communication control response |
| 001001 | 41 | Communicaion hold request |
| 001010 | 42 | Communication hold response |
| 001011 | 43 | Communication continue request |
| 001100 | 44 | Communication continue response |
| 001101-111111 | 45-95 | Reserved |

General Information for First Embodiment 1 and Subsections:

In the above process, the names of messages such as communication hold/control request/response and the names of information such as additional required gap information are all examples, and may be changed to names for similar purposes.

In the above steps, only one of RAN/CN may be linked, or all of them may be linked. For example, the S1307/S11308/S1310/S1311 message may be made only between the RAN and the UE, excluding the CN. For example, the MAC control element, the RRC message, or the like may be used.

In the above process, the user information may be transmitted from the core network to the RAN and the terminal in relation to the movement and permission of the terminal to another system. That is, the network transmits, to the terminal and the RAN, the information on whether or not it is possible to transmit and receive the above messages, transmit the time when transmission and reception are not possible, and on whether to permit it, etc., and operates only when the terminal and the RAN are permitted.

After the operation of FIG. 13, when the terminal is in active communication with each of the system 1 and the system 2, the terminal may not communicate with each system and transmits information on the time it has to move to another system to each system, which may use the methods and messages described above.

However, in the first embodiment and subsection, when the terminal receives the paging in the system 2, the contents included in the paging may be a service that the terminal does not need to receive preferentially, or a service that needs to be received. For example, when a user is browsing the Internet to pass the time on the system 1, if a voice call comes from an important customer to the user terminal through the system 2, the terminal should receive the paging related to a voice call from the system 2. On the other hand, in the above process, when a new instant message comes through the system 2 in the process of making the voice call through the system 1, and the priority of the voice call is high, if the reception of the paging transmitted to the system 2 affects the quality of the voice call in progress in the system 1, the terminal does not need to perform the paging reception to the system 2. In this process, each user has different settings or preferences, such as which services should be prioritized and which services are urgent or not, so a method for differentiation is required.

To this end, the present disclosure proposes that for example, as mentioned in the above scenario, a terminal used by registering in two systems at the same time services may not use all the services provided by both systems, a terminal that needs to restrict the services provided by each system, or a terminal that wants to receive by restricting paging transmits, to the system, information on what kind of traffic the terminal wants to receive paging for each system. When the system that has received the information supports the operation in which the terminal may not always access its own system, the terminal moves to another system in a certain time interval, or the terminal supports an operation that may not transmit and receive in a certain time period, when the above information is received from the terminal, and only when traffic that meets the above conditions occurs, the present disclosure is proposed to transmit paging to the terminal.

Second Embodiment

To this end, in the present disclosure, the terminal collects information on which service or traffic the user wants to receive notification on the system 2 by using a method such as a user's configuration. Alternatively, with respect to the service or traffic set for the user to use system 2, the terminal collects the information on the service or traffic that is prioritized compared to the service currently being used through the system 1. When such a service or traffic exists, the terminal transmits the information on the service or traffic to the system 2, and based on the information transmitted by the terminal, the system 2 transmits paging to the terminal at a specified time when a service or traffic corresponding to the information occurs. That is, when a service or traffic arrives at the terminal, first, the system 2 first determines whether there is information previously transmitted by the terminal, and when the information exists, if the newly arrived service or traffic satisfies the condition specified in the information, the system 2 actually transmits paging to the terminal, and if the specified condition is not satisfied, the system 2 does not transmit paging to the terminal. Through this method, when the terminal receives paging from the system 2, the terminal recognizes that paging for the service it prioritizes has arrived. As a result, while the user is receiving service through system 1, the terminal may alleviate the user's inconvenience for the disconnection of service in that system 1 that inevitably occurs while performing a necessary operation in the system 2.

FIG. 14 illustrates an embodiment to which the present disclosure may be applied. In more detail, FIG. 14 is one example operation according to the second embodiment.

The terminal receives information from the user on which services or traffic the user prioritizes or wants to receive notification from among the services or traffic configured to use the system 2 (S1401).

Based on the information obtained in S1401, the terminal transmits information on which service or traffic the terminal wants to paging to system 2 (S1402). The paging preference indication request and paging preference indication acknowledgment messages used herein are examples of names, and may be included in other messages. As an example, it is assumed that the user wants to receive paging only for App1 from the system 2.

In the system 2, data for App2 arrives from the external Internet (S1403).

The system 2 determines whether to transmit paging to the user based on the information on the paging received from the user, that is, the information obtained through step 2. Here, since App2 is not in the user's preference, the system 2 determines not to transmit the paging (S1404). Here, the system 2 may optionally store traffic corresponding to App2.

In the system 2, data for App1 arrives from the external Internet (S1405).

The system 2 determines whether to transmit paging to the user based on the information on the paging received from the user, that is, the information obtained through step 2. Here, since App1 is satisfied in the user's preference, the system 2 determines to transmit the paging (S1406).

The system 2 transmits the paging (S1407).

The terminal receiving the paging from the system 2 performs a connection process (S1408).

Thereafter, data corresponding to App1 is transmitted to the terminal through the connection (S1409).

For example, in the above process, data or service inspection may be performed in UPF/MME/AMF/SMF, etc.

Third Embodiment

As another implementation method of the present disclosure, instead of the method of the second embodiment, when the system 2 transmits paging to the terminal, the system 2 informs which service or traffic the paging is for in a paging message. Based on this, the terminal may determine whether to actually respond to system 2 or establish a connection.

Capability/Request Paging Extension

FIG. 15 illustrates an embodiment to which the present disclosure may be applied.

The terminal receives information from the user on which services or traffic the user prioritizes or wants to receive notification from among the services or traffic configured to use the system 2 (S1501).

When the terminal wants to selectively receive paging for reasons such as multi-sim or multiple systems, or when it wants to receive additional information on paging, the terminal notifies system 2 of this (S1502). For example, the terminal transmits a Paging Extension Request message. When the network receiving this request from the terminal supports these functions and permits the terminal to use these functions, the network may reply using the Paging Extension Acknowledgment message. Such a message name is an example, and for example, in an Attach, Registration process, or other messages, the terminal informs such intention or capability support.

Data arrives in system 2 through the Internet network or another external network (S1503).

When the network additionally transmits paging when it is determines to provide the paging extension service to the terminal in the previous process, the network additionally transmits information on the arrived data/service (S1504). For example, the P/S-GW or UPF transmits the characteristics of the arrived data, such as IP address, Ethernet header information, or whether a voice call arrives, whether a video call arrives, App ID, etc. to the SMF/AMF or MME. Thereafter, when the SMF/AMF or MME requests the paging to the RAN, the information is transmitted. Here, the information on the App 2 is transmitted along with the paging message.

The terminal receives the paging channel of the system 2 and recognizes that paging has come to itself (S1505). Additionally, when there is extension information in the paging message, the terminal determines whether to respond to the paging by using the extension information, its own local configuration information, or the user's response. For example, based on the information of step 1, here, the terminal determines not to respond to the paging.

Data arrives in system 2 through the Internet network or another external network (S1506).

When the network additionally transmits paging when it is determines to provide the paging extension service to the terminal in the previous process, the network additionally transmits information on the arrived data/service (S1507). For example, the P/S-GW or UPF transmits the characteristics of the arrived data, such as IP address, Ethernet header information, or whether a voice call arrives, whether a video call arrives, App ID, etc. to the SMF/AMF or MME. Thereafter, when the SMF/AMF or MME requests the paging to the RAN, the information is transmitted. Here, the information on the App 1 is transmitted along with the paging message.

The terminal receives the paging channel of the system 2 and recognizes that paging has come to itself. Additionally, when there is extension information in the paging message, the terminal determines whether to respond to the paging by using the extension information, its own local configuration information, or the user's response (S1508). For example, based on the information of step 1, here, the terminal determines to respond to the paging.

The terminal performs a connection establishment procedure (S1509).

Data is transmitted to the terminal (S1510).

According to the above description, for example, the following message may be transmitted to the terminal.

Paging

A paging message is used to notify one or more UEs

Signalling radio bearer: N/A

RLC-SAP: TM

Logical channel: PCCH

Direction: Network to UE

Table 13 illustrates a part of the paging message information element (information element (IE)).

TABLE 13

ASN1START
TAG-PAGING-START
Paging ::=                    SEQUENCE {
pagingRecordList                         PagingRecordList
    OPTIONAL, -- Need N
lateNonCriticalExtension           OCTET STRING
    OPTIONAL,
nonCriticalExtension               SEQUENCE{ }
    OPTIONAL
}
PagingRecordList ::=          SEQUENCE (SIZE(1..maxNrofPageRec))
                                  OF
PagingRecord
PagingRecord ::=              SEQUENCE {
ue-Identity                   PagingUE-Identity,
accessType                           ENUMERATED {non3GPP}
                                  OPTIONAL,
-- Need N
PagingExtentioninfo                  PagingExtentionInfo
..
}
PagingUE-Identity ::=         CHOICE {
ng-5G-S-TMSI                      NG-5G-S-TMSI,
i-RNTI                            I-RNTI-Value,
..
}
PagingExtentionInfo ::=       CHOICE {
Service type                      {MMTEL-Voice, MMTEL-Video,
                                  SMS,
Signalling, MT-data},
Filter info                       {Source IP, Destination IP,
port},
..
}
TAG-PAGING-STOP
-- ASN1STOP Table 14 shows the description of the PagingRecord field.

TABLE 14 accessType
This indicates whether paging is caused by a PDU session that occurs in non-3GPP access.
PagingExtentionInfo
This indicates which service or traffic the paging is related to.

1. General

The purpose of this procedure is as follows.

Transmit paging information to the UE of RRC_IDLE or RRC_INACTIVE.

2. Initiation

The network initiates the paging procedure by transmitting a paging message in the paging context of the UE as specified in TS 38.304 [20]. The network may handle a plurality of UEs in a paging message by including one PagingRecord for each UE.

3. Receive Paging Message by UE

After receiving the paging message, the UE needs to perform the following:

1> When being in RRC_IDLE, if each PagingRecord is included in the paging message:

2> When the ue-Identity included in the PagingRecord matches the UE_ID allocated in the upper layer:

3> ue-Identity and accessType (if present) and PagingExtention (if present) are transmitted to higher layer;

1> When being in RRC_INACTIVE, if each PagingRecord is included in the paging message:

2> When PagingRecord and PagingExtentionInfo (if any) match the stored I-RNTI of the UE:

3> When the UE is configured by a higher layer with a connection ID of 1:

4> The RRC connection resumption procedure is initiated according to 5.3.13 when resumeCause is set to MPS-PriorityAccess;

3> Else if, when the UE is configured by a higher layer with access ID of 2:

4> The RRC connection resumption procedure is initiated according to 5.3.13 when resumeCause is set to MPS-PriorityAccess.

3> Else if, when the UE is configured by higher layer with one or more access IDs such as 11-15:

4> In a state where resumeCause is set to highPriorityAccess, the RRC connection resumption procedure is initiated according to 5.3.13.

3> Else if:

4> In a state where resumeCause is set to mt-Access, the RRC connection resume procedure is initiated according to 5.3.13.

2> Alternatively, when the ue-Identity contained in the PagingRecord and PagingExtentionInfo (if any) matches the UE_ID assigned in the upper layer:

3> The ue-Identity is transmitted to the upper layer and the accessType (if any) is transmitted to the upper layer;

3> According to the release cause 'CN paging', movement to RRC_IDLE specified in 5.3.11 is performed.

Paging Procedure

1. General

The paging procedure is performed only for 3GPP access, and is used by the network to request the establishment of the NAS signaling connection to the UE. In addition, the paging procedure is used to request the UE to reconfigure the user plane resource of the PDU session for downlink user data transmission. Another purpose of the paging procedure is to request the UE to reconfigure user plane resources of a PDU session related to non-3GPP access over 3GPP access. In addition, the network may also initiate a mobile terminating SMS using a paging procedure.

2. Paging for 5GC Services

1) General

Until the NAS signaling message or the user data is transmitted to the UE in 5GMM-IDLE mode, the network should start the paging procedure for the 5GS service.

To start the procedure, the 5GMM entity of the AMF should start paging to the lower layer and start timer T3513. After the UE receives the paging indication, the UE should initiate a service request procedure to respond to the paging (see 3GPP TS 23.502 [9]).

When downlink signaling or user data is to be transmitted over non-3GPP access, the 5GMM entity in the AMF should indicate a lower layer in which the call results from signaling or user data related to non-3GPP access.

After receiving the paging indicator, when pagingExtentioninfo is not available the UE should stop the T3346 timer and, if running, initiate the following:

The service request procedure for 3GPP access to respond to the paging specified in subclause 5.6.1; or Registration procedure for mobility and periodic registration updates via 3GPP access to respond to paging specified in subclause 5.5.1.3

When pagingExtentioninfo is available:

Prioritization for services or traffic indicated by PagingExtentionInfo:

The UE should stop the T3346 timer and, if running, initiate the following:

The service request procedure for 3GPP access to respond to the paging specified in subclause 5.6.1; or Registration procedure for mobility and periodic registration updates via 3GPP access to respond to paging specified in subclause 5.5.1.3 else if

End)

End.

A user/application/UE may set service preference. When the UE is connected to a plurality of systems, the UE may determine whether to respond to paging according to preference. This preference can be expressed in various ways. For example: It can be an IP header (IP source address, IP destination address, etc.) or a service type (for example, mmtel voice, mmtel video).

The network should stop timer T3513 for the paging procedure when it receives the integrity protection response from the UE and the network checks the integrity. When the received response does not protect the integrity or the integrity check fails, the timer T3513 for the calling procedure should continue to run.

When timer T3513 expires, the network may resume paging.

When the network receives downlink signaling or downlink data related to a priority user plane resource for a PDU session while waiting for a response to a paging transmitted without a paging priority, the network should stop the timer T3513 and then start the paging procedure according to the paging priority.

2) Abnormal Cases on the Network Side

There may be unusual cases as follows:

A REGISTRATION REQUEST message is received indicating "initial registration" or "5GS emergency registration" of 5GS registration type IE when the paging procedure is in progress.

When the integrity protection registration request message is received from the UE and the network checks the integrity, the network should stop the paging procedure. When the received registration request message does not protect the integrity or the integrity check does not succeed, the paging procedure should proceed. When the primary authentication and key agreement procedures performed during the initial registration procedure are successfully completed, the paging procedure should be stopped.

3) Abnormal Case in Terminal

There may be unusual cases as follows:

a) Receiving a paging message with the access type set to non-3GPP access while the UE is in 5GMM-CONNECTED mode for non-3GPP access The UE should not respond to the call message.

However, in the above process, the network should support the pagingExtentioninfo only to terminals that actually request or support such information. This may use, for example, the following process.

Registration Request
1. Message Definition
The registration request message is sent by the UE to the AMF.
Message type: REGISTRATION REQUEST
Significance: dual
Direction: UE to network Table 15 is an example of REGISTRATION REQUEST message content.

TABLE 15

| IEI | Information Element | Type/Reference | Presence | Format | Length |
|---|---|---|---|---|---|
|  | Extended protocol discriminator | Extended Protocol discriminator 9.2 | M | V | 1 |
|  | Security header type | Security header type 9.3 | M | V | ½ |
|  | Spare half octet | Spare half octet 9.5 | M | V | ½ |
|  | Registration request message identity | Message type 9.7 | M | V | 1 |
|  | 5GS registration type | 5GS registration type 9.11.3.7 | M | LV | 2 |
|  | ngKSI | NAS key set identifier 9.11.3.32 | M | V | ½ |
|  | Spare half octet | Spare half octet 9.5 | M | V | ½ |
|  | 5GS mobile identity | 5GS mobile identity 9.11.3.4 | M | LV | 5-TBD |
| C- | Non-current native NAS key set identifier | NAS key set identifier 9.11.3.32 | O | TV | 1 |
| 10 | 5GMM capability | 5GMM capability 9.11.3.1 | O | TLV | 3-15 |
| 2E | UE security capability | UE security capability 9.11.3.54 | O | TLV | 4-10 |
| 2F | Requested NSSAI | NSSAI 9.11.3.37 | O | TLV | 4-74 |
| 52 | Last visited registered TAI | 5GS tracking area identity 9.11.3.8 | O | TV | 7 |
| 65 | S1 UE network capability | S1 UE network capability 9.11.3.48 | O | TLV | 4-15 |
| 40 | Uplink data status | Uplink data status 9.11.3.57 | O | TLV | 4-34 |
| 50 | PDU session status | PDU session status 9.11.3.44 | O | TLV | 4-34 |
| B- | MICO indication | MICO indication 9.11.3.31 | O | TV | 1 |
| 2B | UE status | UE status 9.11.3.56 | O | TLV | 3 |
| 2C | Additional GUTI | 5GS mobile identity 9.11.3.4 | O | TLV | TBD |
| 25 | Allowed PDU session status | Allowed PDU session status 9.11.3.13 | O | TLV | 4-34 |
| 60 | UE's usage setting | UE's usage setting 9.11.3.55 | O | TLV | 3 |
| TBD | Requested DRX parameters | DRX parameters 9.11.3.22 | O | TBD | TBD |
|  | Paging Extension Requested | Paging Extension Requested |  |  |  |
| 7C | EPS NAS message container | EPS NAS message container 9.11.3.24 | O | TLV-E | TBD |
| 7E | LADN indication | LADN indication 9.11.3.29 | O | TLV-E | 3-811 |
| 7B | Payload container | Payload container 9.11.3.39 | O | TLV-E | 4-65538 |

2. Non-Current Native NAS Key Set Identifier

When the UE performs a system-to-system change from S1 mode to N1 mode in 5GMM-CONNECTED mode and the UE uses the mapped 5G NAS security context to protect the REGISTRATION Request message, the UE has a valid non-current native 5G NAS security context If present, the UE shall include this IE.

3. 5GMM Capability

Unless the UE performs regular registration renewal procedures, the UE should include the IE.

4. UE Security Capability

Unless the UE performs regular registration renewal procedures, the UE should include the IE.

5. Requested NSSAI

This IE should be included by the UE when performing the registration procedure in the following cases.

a) The UE has an NSSAI configured for the current PLMN.

b) The UE currently has an allowed NSSAI for the PLMN.

c) The UE does not allow NSSAI for the current PLMN and does not set the NSSAI for the current PLMN, and has a configured NSSAI that is not associated with the PLMN.

6. Last Visited Registered TAI

This IE should be included if the UE has a valid last visited registered TAI.

7. S1 UE Network Capability

A UE supporting S1 mode should include this IE, unless the UE performs a regular registration update procedure.

8. Uplink Data Status

When the UE has uplink user data waiting to be transmitted, this IE is included.

9. PDU Session Status

This IE should be included in order for the network to indicate the PDU session associated with the type of access for which the network sends messages that are active on the network.

10. PDU Session Reactivation Result

This IE includes the following:

When uplink data status IE is included in the registration request message;

When an allowed PDU Session State IE is included in the Registration Request message and one or more PDU Sessions are indicated in the allowed PDU Session State IE to re-establish user plane resources via 3GPP access.

11. PDU Session Reactivation Result Error Cause

When an IE is included as a result of PDU session activation and there is at least one PDU session in which the user plane resource may not be reset, this IE may be included, and this is to indicate the cause of the failure to reset the user plane resource.

12. LADN Information

When the current registration area has a valid LADN service area in the UE's subscribed DNN, the network should include this IE.

13. MICO Indication

In the following cases, the network should include a MICO indication IE.

a) The UE includes the MICO indication IE in the registration request message, b) The network supports and allows the use of MICO mode.

14. Network Slicing Indication

This IE should be included when the user's network slicing subscription is changed in UDM.

15. Service Area List

This IE may be included to allocate new service area restrictions to the UE.

16. T3512 Value

The AMF should include this IE during the initial registration procedure via 3GPP access. AMF may include this IE during mobility and periodic registration update procedures over 3GPP access.

17. Non-3GPP De-Registration Timer Value

This IE may be included when the network intends to indicate the access of the non-3GPP registration timer value to the non-3GPP registered UE.

18. T3502 Value

This IE may be included to indicate a value for timer T3502.

19. Emergency Number List

This IE may be transmitted by the network. When this IE is transmitted, the content of this IE indicates a list of emergency numbers valid within the same country as the cell from which this IE is received.

20. Extended Emergency Number List

This IE may be transmitted by the network. When this IE is transmitted, the content of this IE indicates a list of emergency numbers (including URN information) valid within the same country as the cell from which this IE is received.

21. SOR Transparent Container

This IE may be transmitted by the network. When this IE is transmitted, the contents of this IE includes a list of preferred PLMN/access technology combinations (or HPLMN indication given a list of preferred PLMN/access technology combinations as no change to the "Operator Controlled PLMN Selector with Access Technology" list stored in the UE is required) (see 3GPP TS 23.122 [5] Annex C) and optional authorization requests.

22. EAP Message

An EAP message IE is included when a registration accept message is transmitted as part of emergency service registration and is used to transmit EAP failure messages.

23. Paging Extension Supported

This field indicates whether the network supports transmission of paging extension information through a paging message.

FIG. 16 is a flowchart according to an embodiment of a terminal to which the present disclosure may be applied.

Referring to FIG. 16, the terminal is in a registered state in relation to a first network and a second network, and is in a connected state in relation to the first network.

The terminal transmits a request message for receiving paging of the second network to the first network (S1610). In more detail, the request message may include information on the time for requesting the first network to receive the paging from the second network. For example, the information on the time may include a time when the terminal needs to leave the first network or a time when data may not be properly transmitted/received through the first network.

The terminal receives a response message as a response to the request message from the first network (S1620). In more detail, the response message may include the information on the time supported by the first network to receive the paging from the second network. For example, such time-related information may include a time when the terminal does not need to transmit/receive data through the first network or a time during which the terminal may switch to the second network to perform an operation.

The terminal monitors the second network or switches to the second network in order to receive a paging from the second network based on the received response message (S1630).

General Device to which the Present Disclosure May be Applied

FIG. 17 is a block configuration diagram of a communication device according to an embodiment of the present disclosure.

Referring to FIG. 17, a wireless communication system includes a network node 1710 and a plurality of terminals (UEs) 1720.

The network node 1710 includes a processor 1711, a memory 1712, and a communication module (transceiver) 1713. The processor 1711 implements the functions, the processes, and/or the methods described above with reference to FIGS. 1 to 14. The layers of the wired/radio interface protocol may be implemented by the processor 1711. The memory 1712 is connected to the processor 1711 and stores various information for driving the processor 1711. The communication module 1713 is connected to the processor 1711 and transmits and/or receives a wired/wireless signal. Examples of the network node 1710 may include a base station, an AMF, an SMF, a UDF, or the like. In particular, when the network node 1710 is the base station, the communication module 1713 may include a radio frequency unit (RF) for transmitting/receiving a wireless signal.

The terminal 1720 includes a processor 1721, a memory 1722, and a communication module (transceiver) 1723. The processor 1721 implements the functions, the processes, and/or the methods described above with reference to FIGS. 1 to 16. The layers of the radio interface protocol may be implemented by the processor 1721. In particular, the processor may include a NAS layer and an AS layer. The memory 1722 is connected to the processor 1721 and stores various information for driving the processor 1721. The RF unit 1723 is connected to the processor 1721 and transmits and/or receives a wireless signal.

The memories 1712 and 1722 may be inside or outside the processors 1711 and 1721 and may be connected to the processors 1711 and 1721 by various well-known means. Also, the network node 1710 (in the case of the base station) and/or the terminal 1720 may include a single antenna or multiple antennas.

FIG. 18 is a block configuration diagram of a communication device according to an embodiment of the present disclosure.

In particular, FIG. 18 is a diagram illustrating the terminal of FIG. 17 in more detail. The communication module illustrated in FIG. 17 includes an RF module (or RF unit) of FIG. 18. The processor illustrated in FIG. 17 corresponds to a processor (or a digital signal processor (DSP)) 1810 in FIG. 18. The memory illustrated in FIG. 17 corresponds to a memory 1830 of FIG. 18.

Referring to FIG. 18, a terminal may be configured to include a processor (or a digital signal processor (DSP)) 1810, an RF module (or RF unit) 1835, a power management module 1805, an antenna 1840, a battery 1855, a display 1815, a keypad 1820, a memory 1830, a subscriber identification module (SIM) card 1825 (this configuration is optional), a speaker 1845, and a microphone 1850. The terminal may also include a single antenna or multiple antennas.

The processor 1810 implements the functions, the processes and/or the methods described above. The layers of the radio interface protocol may be implemented by the processor 1810.

The memory 1830 is connected to the processor 1810 and stores various information related to an operation of the processor 1810. The memory 1830 may be inside or outside the processor 1810 and may be connected to the processor 1810 by various well-known means.

The user inputs command information such as a telephone number, for example, by pressing (or touching) a button on the keypad 1820 or by voice activation using the microphone 1850. The processor 1810 receives the command information and performs a proper function as placing a call by a phone number. Operational data may be extracted from the SIM card 1825 or the memory 1830. In addition, the processor 1810 may display command information or driving information on the display 1815 for the user to recognize and for convenience.

The RF unit 1835 is connected to the processor 1810 and transmits and/or receives an RF signal. The processor 1810 transmits command information to the RF module 1835 to transmit, for example, a wireless signal constituting voice communication data to initiate communication. The RF module 1835 includes a receiver and a transmitter for receiving and transmitting a wireless signal. The antenna 1840 functions to transmit and receive the radio signal. When receiving the wireless signal, the RF module 1835 may transmit a signal and convert the signal into baseband to be processed by the processor 1810. The processed signal may be converted into audible or readable information output through the speaker 1845.

FIG. 19 illustrates a structure of a radio interface protocol in a control plane between a UE and eNodeB.

The radio interface protocol is based on the 3GPP radio access network standard. The radio interface protocol is composed of a physical layer (physical layer), a data link layer (data link layer) and a network layer (network layer) horizontally, and is vertically divided into a user plane for data information transmission and a control plane for signaling transmission.

The protocol layers are based on a lower three layers of a open system interconnection (OSI) reference model, which is widely known in communication systems, and may be divided into L1 (first layer), L2 (second layer), and L3 (third layer).

Hereinafter, each layer of the radio protocol of the control plane illustrated in FIG. 19 will be described.

The physical layer, which is the first layer, provides an information transfer service using a physical channel. The physical layer is connected to a medium access control layer on the upper side through a transport channel, and data between the medium access control layer and the physical layer is transmitted through the transport channel. In addition, data is transferred between different physical layers, that is, between physical layers of a transmitting side and a receiving side through a physical channel.

The physical channel is composed of several subframes on a time axis and several sub-carriers on a frequency axis. Here, one subframe is composed of a plurality of symbols and a plurality of subcarriers on the time axis. One subframe is composed of a plurality of resource blocks, and one resource block is composed of a plurality of symbols and a plurality of subcarriers. The transmission time interval (TTI), which is a unit time for transmitting data, is 1 ms corresponding to one subframe.

According to 3GPP LTE, the physical channels present in the physical layer of the transmitting side and the receiving side may be divided into a physical downlink shared channel (PDSCH) and a physical uplink shared channel (PUSCH) which are data channels, and a physical downlink control channel (PDCCH), a physical control format indicator channel (PCFICH), a physical hybrid-ARQ indicator channel (PHICH), and a physical uplink control channel (PUCCH) which are control channels.

The PCFICH transmitted in a first OFDM symbol of a subframe carries a control format indicator (CFI) regarding the number of OFDM symbols (that is, the size of the control region) used for transmission of control channels in the subframe. The wireless device first receives the CFI on the PCFICH and then monitors the PDCCH.

Unlike the PDCCH, the PCFICH does not use blind decoding and is transmitted on a fixed PCFICH resource of a subframe.

The PHICH carries a positive-acknowledgement (ACK)/negative-acknowledgement (NACK) signal for a UL hybrid automatic repeat request (HARQ). The ACK/NACK signal for uplink (UL) data on the PUSCH transmitted by the wireless device is transmitted on the PHICH.

The physical broadcast channel (PBCH) is transmitted in preceding four OFDM symbols of a second slot of a first subframe of the radio frame. The PBCH carries system information necessary for the wireless device to communicate with the base station, and the system information transmitted through the PBCH is called a master information block (MIB). In comparison, the system information transmitted on the PDSCH indicated by the PDCCH is called a system information block (SIB).

The PDCCH may carry resource allocation of an upper layer control message such as a resource allocation and transmission format of a downlink-shared channel (DL-SCH), resource allocation information of an uplink shared channel (UL-SCH), paging information on a PCH, system information on the DL-SCH, and a random access response transmitted on the PDSCH, an aggregation of transmission power control commands for individual UEs in a UE group, activation of a voice over internet protocol (VoIP), and the like. A plurality of PDCCHs may be transmitted in the control region, and the terminal may monitor the plurality of PDCCHs. The PDCCH is transmitted on an aggregation of one or several consecutive control channel elements (CCEs). The CCE is a logical allocation unit used to provide a PDCCH with a coding rate according to a state of a radio channel. The CCE corresponds to a plurality of resource element groups. The format of the PDCCH and the number of bits of the allowed PDCCH are determined according to the correlation between the number of CCEs and the coding rate provided by the CCEs.

The control information transmitted through the PDCCH is called downlink control information (DCI). The DCI may include the resource allocation (referred to as DL grant) of the PDSCH, the resource allocation (referred to as UL grant) of the PUSCH, and an aggregation of transmit power control commands for individual UEs in any UE group and/or activation of the voice over internet protocol (VoIP)

There are several layers in the second layer. First, a medium access control (MAC) layer is responsible for mapping various logical channels to various transport channels, and also for logical channel multiplexing to map multiple logical channels to one transport channel. The MAC layer is connected to an RLC layer as an upper layer by a logical channel, and the logical channel is largely divided into a control channel that transmits information of a control plane according to the type of information to be transmitted and a traffic channel that transmits user plane information.

A radio link control (RLC) layer of the second layer serves to adjust the data size so that the lower layer is suitable for transmitting data to the radio section by segmenting and concatenating data received from the upper layer. In addition, three operation modes of a transparent mode (TM), an un-acknowledged mode (UM) (non-response mode), and an acknowledged mode (AM) (response mode) are provided to ensure various QoS required by each radio bearer (RB). In particular, the AM RLC performs a retransmission function through an automatic repeat and request (ARQ) function for reliable data transmission.

A packet data convergence protocol (PDCP) layer of the second layer performs a header compression function of reducing an IP packet header size having a relatively larger size and unnecessary control information for efficient transmission in a radio section having a low bandwidth when transmitting IP packets such as IPv4 or IPv6. This transmits only the necessary information in the header portion of the data, thereby increasing the transmission efficiency of the radio section. In addition, in the LTE system, the PDCP layer also performs a security function, which is composed of encryption (Ciphering) for preventing third-party data interception and integrity protection for preventing third-party data manipulation.

The radio resource control layer (hereinafter abbreviated as RRC) layer located at the top of the third layer is defined only in the control plane, and serves to control the logical channels, the transport channels, and the physical channels in connection with the setting, resetting, and release of the radio bearers (abbreviated as RB). In this case, the RB means a service provided by the second layer for data transmission between the terminal and the E-UTRAN.

If there is an RRC connection (RRC connection) between the RRC of the terminal and the RRC layer of the radio network, the terminal is in the RRC connected state (connected mode), and otherwise, the terminal is in the RRC idle state (Idle mode).

Hereinafter, the RRC state and the RRC connection method of the UE will be described. The RRC state refers to whether or not the RRC of the terminal is logically connected with the RRC of the E-UTRAN. The case where the RRC of the terminal is logically connected with the RRC of the E-UTRAN is referred to as the RRC_CONNECTED state, and the case where the RRC of the terminal is not logically connected with the RRC of the E-UTRAN is referred to as the RRC_IDLE state. Since the terminal in the RRC_CONNECTED state has an RRC connection, the E-UTRAN can detect the existence of the corresponding terminal in units of cells, thereby effectively controlling the terminal. On the other hand, the terminal in the RRC_IDLE state cannot detect the existence of the terminal by the E-UTRAN, and manages the core network in a tracking area (TA) unit which is a larger area unit than the cell. That is, the terminal in the RRC_IDLE state only detects whether the terminal exists in a larger area than the cell, and the terminal needs to transition to the RRC_CONNECTED state in order to receive a normal mobile communication service such as voice or data. Each TA is identified by a tracking area identity (TAI). The terminal may configure a TAI through a tracking area code (TAC), which is information broadcast in a cell.

When the user first turns on the power of the terminal, the terminal first searches for an appropriate cell, then establishes an RRC connection in the cell, and registers the terminal's information in the core network. Thereafter, the terminal stays in the RRC_IDLE state. The terminal staying in the RRC_IDLE state (re) selects a cell as needed and looks at system information or paging information. This is called camping on the cell. When it is necessary to establish an RRC connection, the terminal staying in the RRC_IDLE state makes an RRC connection with the RRC of the E-UTRAN through an RRC connection procedure and transitions to the RRC_CONNECTED state. There are several cases in which the terminal in the RRC_IDLE state needs to establish the RRC connection. For example, when an uplink data transmission is necessary due to a user's call attempt, or when the paging signal is received from the E-UTRAN, there may be a response message transmission thereto, and the like.

The non-access stratum (NAS) layer performs functions such as session management and mobility management.

The following describes the NAS layer illustrated in FIG. 19 in detail.

The NAS layer is divided into a NAS entity for mobility management (MM) and a NAS entity for session management (SM).

1) The NAS entity for MM provides the following general functions.

The NAS procedure associated with the AMF includes the followings.

Registration management and access management procedure. The AMF supports the following functions.

NAS signal connection (integrity protection, encryption) between the UE and the AMF 2) The NAS entity for the SM performs the session management between the UE and the SMF.

The SM signaling message are processed, i.e. generated and processed, at the NAS-SM layer of the UE and the SMF. The content of the SM signaling message is not interpreted by the AMF.

For the SM signaling transmission

The NAS entity for the MM generates a security header indicating the NAS transmission of SM signaling and a NAS-MM message that guides a method and a location for transferring an SM signaling message through additional information on the received NAS-MM.

Upon receiving the SM signaling, the NAS entity for the SM performs an integrity check of the NAS-MM message and a method and a location for interpreting additional information to derive an SM signaling message.

Meanwhile, in FIG. 19, the RRC layer, the RLC layer, the MAC layer, and the PHY layer located under the NAS layer are collectively referred to as an access stratum (AS).

In the present disclosure, the wireless device may be a base station, a network node, a transmission terminal, a reception terminal, a radio device, a wireless communication device, a vehicle, a vehicle on which a self-driving function is mounted, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service in addition to the devices. For example, the drone may be a flight vehicle that flies by a wireless control signal without a person being on the flight vehicle. For example, the MTC device and the IoT device are devices that do not require a person's direct intervention or manipulation, and may include a smart meter, a vending machine, a thermometer, a smart bulb, a door lock or a variety of sensors. For example, the medical device may be a device used for the purpose of diagnosing, treating, reducing, handling or preventing a disease or a device used for the purpose of testing, substituting or modifying a structure or function, and may include equipment for medical treatment, a device for operation, a device for (external) diagnosis, a hearing aid or a device for a surgical procedure. For example, the security device is a device installed to prevent a possible danger and to maintain safety, and may be a camera, CCTV, or a blackbox. For example, the FinTech device is a device capable of providing financial services, such as mobile payment, and may include a payment device or point of sales (POS). For example, the climate/environment device may mean a device for monitoring or predicting a climate/environment.

The mobile terminal described in the present disclosure may include a mobile phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. Furthermore, the mobile terminal may be used to control at least one device in an Internet of Things (IoT) environment or a smart greenhouse.

However, a person skilled in the art will easily understand that the configuration according to the embodiments described in the present disclosure may be applied to stationary devices, such as digital TV, a desktop computer, and digital signage except a case where the configuration is applicable to mobile terminal.

The embodiments related to a control method which may be implemented in the mobile terminal configured as described above have been described with reference to the accompanying drawings. It is evident to those skilled in the art that the present disclosure may be materialized in another specific form without departing from the spirit and essential characteristics of the present disclosure.

The aforementioned embodiments of the present disclosure may be implemented through various means. For example, the embodiments of the present disclosure may be implemented by hardware, firmware or software, or a combination thereof.

In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, a method according to the embodiments of the present disclosure may be implemented in the form of a device, a procedure, or a function that performs the aforementioned functions or operations. A software code may be stored in the memory unit and executed by the processor. The memory unit may be positioned inside or outside the processor and may transmit and receive data to/from the processor by already various means The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The aforementioned communication method may be applied to various wireless communication systems including IEEE 802.16x and 802.11x systems in addition to a 3GPP system. Furthermore, the proposed method may also be applied to an mmWave communication system using an ultra-high frequency band.

The invention claimed is:

1. A method performed by a user equipment (UE) in a wireless communication system, the method comprising:
in radio resource control (RRC) inactive state which is distinct from RRC idle state, receiving, from a first network, a core network (CN) initiated paging message that includes paging information indicating whether the paging message is related to a voice service;
based on the UE in the RRC inactive state supporting the voice service, forwarding the paging information to upper layers of the UE; and
initiating a connection establishment with the first network based on the paging message.

2. The method of claim 1, further comprising:
transmitting, to a second network, a first request message for receiving the paging message of the first network; and
receiving, from the second network, a first response message as a response to the first request message,
wherein receiving the paging message from the first network is based on the first response message,
wherein the UE is in a registered state in relation to the second network and the first network, and in a connected state in relation to the second network.

3. The method of claim 2,
wherein the first request message includes time information indicating when the UE requests the second network to receive signaling from the first network,
wherein the first response message includes time information indicating when the UE has no signaling received from the second network or signaling transmitted to the second network.

4. The method of claim 2, further comprising:
transmitting, to the second network, a second request message for switching to the first network based on the paging message received from the first network; and
receiving, from the second network, a second response message as the response to the first request message.

5. The method of claim 4, wherein the second request message is for temporarily stopping the connected state related to the second network.

6. The method of claim 4, wherein the second request message includes time information required in relation to a procedure performed by the UE through the first network.

7. The method of claim 4, wherein the second response message includes time information when data transmission/reception does not occur between the second network and the UE.

8. The method of claim 4, further comprising:
performing configuration related to establishment of a communication connection with the first network based on the paging message received by the first network;
transmitting, to the second network, a third request message for re-adjusting a communication connection with the second network based on the configuration related to the establishment of the communication connection; and
receiving, from the second network, a third response message as a response to the third request message.

9. The method of claim 8, wherein the third request message includes time information when the UE does not communicate with the second network.

10. The method of claim 8, wherein the third response message includes time information indicating when there is no signaling received from the second network or signaling transmitted to the second network.

11. The method of claim 8, further comprising:
transmitting, to the first network, a fourth request message for requesting paging message related to a preferred service or traffic; and
receiving a paging message from the first network as a response to the fourth request message.

12. The method of claim 1, wherein the paging message of the first network includes information related to a type of the service or traffic supported by the first network.

13. A user equipment (UE) in a wireless communication system, the UE comprising:
a transceiver;
a memory; and
a processor configured to control the transceiver and the memory,
wherein the processor is configured to:
in radio resource control (RRC) inactive state which is distinct from RRC idle state, receive, from a first network, a core network (CN) initiated paging message that includes paging information indicating whether the paging message is related to a voice service;
based on the UE in the RRC inactive state supporting the voice service, forward the paging information to upper layers of the UE; and
initiate a connection establishment with the first network based on the paging message.

14. The UE of claim 13, wherein the processor is further configured to:
transmit, to a second network, a first request message for receiving the paging message of the first network; and
receive, from the second network, a first response message as a response to the first request message,
wherein receiving the paging message from the first network is based on the first response message,
wherein the UE is in a registered state in relation to the second network and the first network, and in a connected state in relation to the second network.

15. The UE of claim 14,
wherein the first request message includes time information indicating when the UE requests the second network to receive signaling from the first network,
wherein the first response message includes time information indicating when the UE has no signal received from the second network or signal transmitted to the second network.

16. The UE of claim 14, wherein the processor is further configured to:
- transmit, to the second network, a second request message for switching to the first network based on the paging message received from the first network, and
- receive, from the second network, a second response message as the response to the first request message.

17. The UE of claim 16, wherein the second request message is for temporarily stopping the connected state related to the second network.

18. The UE of claim 16, wherein the second request message includes time information required in relation to a procedure performed by the UE through the first network.

19. The UE of claim 16, wherein the second response message includes time information when data transmission/reception does not occur between the second network and the UE.

20. The UE of claim 16, wherein the processor is further configured to:
- perform configuration related to establishment of a communication connection with the first network based on the paging message received by the first network;
- transmit, to the second network, a third request message for re-adjusting a communication connection with the second network based on the configuration related to the establishment of the communication connection; and
- receive, from the second network, a third response message as a response to the third request message.

* * * * *